US007185352B2

(12) United States Patent
Hallford et al.

(10) Patent No.: US 7,185,352 B2
(45) Date of Patent: Feb. 27, 2007

(54) METHOD AND APPARATUS FOR COMBINING BROADCAST SCHEDULES AND CONTENT ON A DIGITAL BROADCAST-ENABLED CLIENT PLATFORM

(75) Inventors: Jason C. Hallford, Hillsboro, OR (US); Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 09/854,129

(22) Filed: May 11, 2001

(65) Prior Publication Data

US 2002/0167947 A1    Nov. 14, 2002

(51) Int. Cl.
*H04N 7/16* (2006.01)

(52) U.S. Cl. .......................................... 725/28; 725/47
(58) Field of Classification Search ............. 725/9–21, 725/37–61, 109, 110, 112, 113
See application file for complete search history.

(56) References Cited

U.S. PATENT DOCUMENTS

| 4,602,279 | A | 7/1986 | Freeman |
| 5,075,771 | A | 12/1991 | Hashimoto |
| 5,155,591 | A | 10/1992 | Wachob |
| 5,392,223 | A | 2/1995 | Caci |
| 5,410,344 | A | 4/1995 | Graves et al. |
| 5,444,499 | A | 8/1995 | Saitoh |
| 5,446,919 | A | 8/1995 | Wilkins |
| 5,483,278 | A | 1/1996 | Strubbe et al. |
| 5,534,911 | A | 7/1996 | Levitan |
| 5,559,549 | A | 9/1996 | Hendricks et al. |
| 5,564,088 | A | 10/1996 | Saitoh |

(Continued)

FOREIGN PATENT DOCUMENTS

EP     0902569 A1    3/1999

(Continued)

OTHER PUBLICATIONS

"Client Infrastructure for Internet-Based Data Services for Digital Television: Enabling a New Class of DTV Services", *Intel Architecture Labs*, (2000),1-10.

(Continued)

*Primary Examiner*—Jeffery Hofsass
*Assistant Examiner*—Shirley Lu
(74) *Attorney, Agent, or Firm*—Blakely, Sokoloff, Taylor & Zafman LLP

(57) ABSTRACT

A service provider broadcast system and method are described. The method includes acquiring network service information regarding broadcast service content to be broadcast by a broadcast service system over a predetermined period. Using the network service information, a composite content list is created, including meta-data describing service provider content available from the service provider system and the broadcast service content. The composite content listed is broadcast to client systems, which in turn, provide ratings for the service provider and broadcast service content described by the composite content list. Using the received ratings, the service provider system selects a portion of the broadcast service content and generates a broadcast schedule for the selected content. The broadcast schedule is then broadcast to the client systems to enable the client systems to store one or more of the content data files from the selected portion of the broadcast service content.

31 Claims, 14 Drawing Sheets

U.S. PATENT DOCUMENTS

| | | | |
|---|---|---|---|
| 5,566,174 A * | 10/1996 | Sato et al. ................. 370/468 |
| 5,585,838 A | 12/1996 | Lawler et al. |
| 5,600,364 A | 2/1997 | Hendricks et al. |
| 5,619,247 A * | 4/1997 | Russo ........................ 725/104 |
| 5,654,747 A | 8/1997 | Ottesen et al. ................. 725/1 |
| 5,664,091 A | 9/1997 | Keen |
| 5,686,954 A | 11/1997 | Yoshinobu et al. |
| 5,724,345 A | 3/1998 | Guarneri et al. |
| 5,727,002 A | 3/1998 | Miller et al. |
| 5,751,282 A | 5/1998 | Girard et al. |
| 5,768,681 A | 6/1998 | Dan et al. |
| 5,778,182 A | 7/1998 | Cathey et al. |
| 5,790,935 A | 8/1998 | Payton |
| 5,801,753 A | 9/1998 | Eyer et al. |
| 5,838,678 A | 11/1998 | Davis et al. |
| 5,867,799 A | 2/1999 | Lang et al. |
| 5,920,700 A | 7/1999 | Gordon et al. |
| 5,930,493 A | 7/1999 | Ottesen et al. |
| 5,937,411 A | 8/1999 | Becker |
| 5,940,738 A | 8/1999 | Rao |
| 5,945,988 A | 8/1999 | Williams et al. |
| 5,973,683 A | 10/1999 | Cragun et al. |
| 5,977,964 A | 11/1999 | Williams et al. |
| 5,991,841 A | 11/1999 | Gafken et al. |
| 5,999,526 A | 12/1999 | Garland et al. |
| 6,002,393 A | 12/1999 | Hite et al. |
| 6,002,852 A | 12/1999 | Birdwell et al. |
| 6,005,597 A | 12/1999 | Barrett et al. |
| 6,006,247 A | 12/1999 | Browning et al. |
| 6,018,768 A | 1/2000 | Ullman et al. |
| 6,020,883 A | 2/2000 | Herz et al. |
| 6,021,433 A | 2/2000 | Payne et al. |
| 6,055,560 A | 4/2000 | Mills et al. |
| 6,088,722 A | 7/2000 | Herz et al. |
| 6,108,645 A | 8/2000 | Eichstaedt et al. |
| 6,114,376 A | 9/2000 | Prichard et al. |
| 6,119,189 A | 9/2000 | Gafken et al. |
| 6,125,259 A | 9/2000 | Perlman |
| 6,131,127 A | 10/2000 | Gafken et al. |
| 6,144,376 A | 11/2000 | Connelly |
| 6,148,005 A | 11/2000 | Paul et al. |
| 6,160,989 A | 12/2000 | Hendricks et al. |
| 6,184,918 B1 | 2/2001 | Goldschmidt Iki et al. |
| 6,279,040 B1 | 8/2001 | Ma et al. |
| 6,289,012 B1 | 9/2001 | Harrington et al. |
| 6,289,510 B1 | 9/2001 | Nakajima |
| 6,298,482 B1 | 10/2001 | Seidman et al. ............. 725/101 |
| 6,304,578 B1 | 10/2001 | Fluss |
| 6,317,881 B1 | 11/2001 | Shah-Nazaroff et al. |
| 6,320,850 B1 | 11/2001 | Perahia et al. |
| 6,349,321 B1 | 2/2002 | Katayama |
| 6,359,557 B2 | 3/2002 | Bilder |
| 6,359,571 B1 | 3/2002 | Endo et al. |
| 6,374,405 B1 | 4/2002 | Willard |
| 6,378,036 B2 | 4/2002 | Lerman et al. |
| 6,389,593 B1 | 5/2002 | Yamagishi |
| 6,397,387 B1 | 5/2002 | Rosin et al. |
| 6,424,625 B1 | 7/2002 | Larsson et al. |
| 6,434,747 B1 | 8/2002 | Khoo et al. |
| 6,449,632 B1 | 9/2002 | David et al. |
| 6,457,010 B1 | 9/2002 | Eldering et al. |
| 6,460,036 B1 | 10/2002 | Herz et al. |
| 6,467,089 B1 | 10/2002 | Aust et al. |
| 6,480,783 B1 | 11/2002 | Myr |
| 6,490,722 B1 | 12/2002 | Barton et al. ................ 717/174 |
| 6,513,069 B1 | 1/2003 | Abato et al. |
| 6,526,455 B1 | 2/2003 | Kamimura |
| 6,529,526 B1 | 3/2003 | Schneidewend ............ 370/486 |
| 6,557,042 B1 | 4/2003 | He et al. |
| 6,570,843 B1 | 5/2003 | Wolfgang |
| 6,571,389 B1 | 5/2003 | Spyker et al. |
| 6,574,518 B1 | 6/2003 | Lounsberry et al. |
| 6,578,199 B1 | 6/2003 | Tsou et al. |
| 6,594,682 B2 | 7/2003 | Peterson et al. |
| 6,601,237 B1 | 7/2003 | Ten Kate et al. ............. 725/47 |
| 6,611,842 B1 | 8/2003 | Brown |
| 6,617,980 B2 | 9/2003 | Endo et al. |
| 6,678,890 B1 | 1/2004 | Cai |
| 2001/0012299 A1 | 8/2001 | Dahlen |
| 2001/0013127 A1 | 8/2001 | Tomita et al. |
| 2001/0037507 A1 | 11/2001 | Mori |
| 2002/0112235 A1 | 8/2002 | Ballou et al. ................. 725/25 |
| 2002/0199194 A1 | 12/2002 | Ali .............................. 725/46 |
| 2003/0056216 A1 | 3/2003 | Wugofski et al. ............. 725/46 |
| 2003/0074664 A1 | 4/2003 | Kwoh ......................... 725/48 |
| 2003/0097657 A1 | 5/2003 | Zhou et al. ................... 725/46 |
| 2004/0123323 A1 | 6/2004 | Russo ......................... 725/88 |
| 2004/0163014 A1 | 8/2004 | Schein et al. ................. 725/13 |
| 2004/0221307 A1 * | 11/2004 | Arai et al. .................... 725/44 |
| 2005/0155063 A1 * | 7/2005 | Bayrakeri et al. ............ 725/47 |

FOREIGN PATENT DOCUMENTS

| | | |
|---|---|---|
| EP | 1028551 | 8/2000 |
| EP | 1 043 892 A1 | 10/2000 |
| EP | 1 089 571 A2 | 4/2001 |
| EP | 1089201 | 4/2001 |
| EP | 1089571 | 4/2001 |
| WO | WO-97/26729 | 7/1997 |
| WO | WO-99/44159 | 9/1999 |
| WO | WO-99/65237 | 12/1999 |
| WO | WO-00/01149 | 1/2000 |
| WO | WO 00/59204 | 10/2000 |
| WO | WO-00/64165 | 10/2000 |
| WO | WO-01/15449 | 3/2001 |
| WO | WO-01/15451 | 3/2001 |
| WO | WO-01/17195 | 3/2001 |
| WO | WO-01/72042 | 9/2001 |
| WO | WO-01/93524 | 12/2001 |
| WO | WO-02/48863 | 6/2002 |
| WO | WO-02/103940 | 12/2002 |
| WO | WO-02/103941 | 12/2002 |
| WO | WO-02/104030 | 12/2002 |
| WO | WO-02/104031 | 12/2002 |
| WO | WO-03/028381 | 4/2003 |
| WO | WO-03/030540 | 4/2003 |
| WO | WO-03/061245 | 7/2003 |

OTHER PUBLICATIONS

"Competitive Differences. ReplayTV Rules. Here's why . . . ", Webpages. <URL: http://www.replaytv.com/overview/differences.htm, ReplayTV,(Mar. 21, 2000),1-2.

"Digital Video Broadcasting (DVB); Specification for Service Information (SI) in DVB Ssytems", *ETSI EN 300 468 V1.4.1*, European Standard (Telecommunications series),(Nov. 2000),1-85.

"Enhanced Digital Broadcast", Webpages. <URL: http//www.developer.intel.com/ial/home/digentertain/edg.htm, IAL Digital Entertain Initiative,(Aug. 12, 2001),1-3.

"Features", Webpage <URL http://www.replaytv.com/overview/features.htm, ReplayTV,(Mar. 21, 2000),1-2.

"Features Benefits", Webpages. <URL http://www.replaytv.com/overview/details.htm, ReplayTV,(Mar. 21, 2000),1-3.

"Frequently Asked QUESTIONS", Webpages. <URL http://www.tivo.com//what/faq_sub.html, TiVo.com,(Mar. 21, 2000),1-9.

"Frequently Asked Questions. Will ReplayTV make more popular? And other frequently asked questions.", Webpages. <URL http://www.replaytv.com/overview/faqs.htm, ReplayTV,(Mar. 21, 2000),1-4.

"Internet and Broadcast: The Key to Digital Convergence. Utilizing Digital Technology to Meet Audience Demand", *Intel Architecture Labs Digital Entertainment Initiative*, (2000),1-4.

"PCT International Search Report", Appl. No. PCT/US01/43862, Mailed Dec. 4, 2003,1-4.

"PCT International Search Report", Appl. No. PCT/US02/17270, Mailed Jun. 3, 2003,1-4.

"PCT International Search Report", Appl. No. PCT/US02/17381, Mailed Oct. 20, 2003,1-6.

"PCT International Search Report", Appl. No. PCT/US02/17316, Mailed Nov. 6, 2002,1-8.

"PCT International Search Report", Appl. No. PCT/US02/29099, Mailed Mar. 28, 2003,1-7.

"PCT International Search Report", Appl. No. PCT/US03/00169, Mailed Jun. 2, 2003,1-7.

"Program and System Information Protocol for Terrestrial Broadcast and Cable (Revision A) and Amendment No. 1", *Advanced Television Systems Committee,* Originally Published Dec. 27, 1997,(May 31, 2000),i-iii, 1-135.

"Technical Specifications", Webpage. <URL http://www.replaytv.com/overview/techspecs.htm, ReplayTV,(Mar. 21, 2000),1.

"What is ReplayTV? Introducing the new ReplayTV 2020", Webpage. <URL: http://www.replaytv.com/overview/index.htm, ReplayTV,(Mar. 21, 2000),1.

"What is TiVo? Introduction to TiVo. A Better Way to WATCH TV", Webpage. <URL http://www.tivo.com/what/intro.html, TiVo.com,(Mar. 21, 2000),1.

"What is TiVo? How TiVo Works. PRODUCT Specifications", Webpage. <URL http://www.tivo.com/what/how2.html, TiVo.com, (Mar. 21, 2000),1.

"What is TiVo? How TiVo Works. What You Want, When You Want It", Webpage. <URL http://www.tivo.com/what/how.html, TiVo.com,(Mar. 21, 2000),1.

"What is TiVo? Introduction TiVo. Channel SURF in a Whole New Way", Webpage. <URL http://www.tivo.com/what/intro4.html, TiVo.com,(Mar. 21, 2000),1.

"What is TiVo? Introduction to TiVo. Control LIVE TV", Webpage. <URL http://www.tivo.com/what/intro2.html, TiVo.com,(Mar. 21, 2000),1.

"What is TiVo? Introduction to TiVo. Something GOOD is Always On", Webpage. <URL http://www.tivo.com/what/intro3.html, TiVo.com,(Mar. 21, 2000),1.

"What isTiVo? Introduction to TiVo. DIGITAL Recordings without the Tape", Webpage. <URL http://www.tivo.com/what/intro5.html, TiVo.com,(Mar. 21, 2000),1.

"White Paper, Internet Protocol (IP) Multicast Technology Overview", Webpages. <URL: http//www.cisco.com/warp/public/cc/pd/iosw/tech/ipmu_ov.htm, Cisco Systems, Inc.,(Jun. 29, 2001),1-16.

Gummalla, Ajay Chandra V., "An Access Protocol for a Wireless Home Network", *IEEE,* Wireless Communications and Networking Conference, Sep. 21, 1999,1392-1396.

Hartwig, Stephan , et al., "Broadcasting and Processing of Program Guides for Digital TV", *SMPTE Journal, SMPTE, Inc.,* vol. 106, No. 10, Scarsdale, NY, XP000668926,(Oct. 1997),727-732.

Haskell, Barry G., et al., "Digital Video: An Introduct to MPEG-2", *Digital Multimedia Standards Series,* Chapman & Hall,(1977),cover, 280-283.

Haubner, Dr. P. , et al., "Netzdienste fur Multimediale Anwendungen CSCW—MBone", *Teleseminar: Multimedia Systeme—Technologie and Gestaltung WS 95/96,* XP002248684,(1996),1-20.

Holfeder, Wieland , "Interactive Remote Recording and Playback of Multicast Videoconferences", XP002088645,(Sep. 10, 1997),450-463.

Hu, Qinglong , et al., "Power Conservative Multi-Attribute Queries on Data Broadcast", *IEEE,* Data Engineering, 16th International Confererence, San Diego, Calif.,(2000),157-177.

Hwang, Ren-Hung , et al., "Scheduling Policies for an VOD System over CATV Networks", *IEEE,* Department of Computer Science & Information Engineering,(1997),438-442.

Smyth, Barry , et al., "A Personalized TELEVISION Listings Service", *Communications of the ACM,* vol. 43, No. 8,(Aug. 2000), 107-111.

Wittig, Hartmut , et al., "Intelligent Media Agents in Interactive Television Systems", *IEEE,* Proceedings of the Int'l Conf. on Multimedia Computing and Systems, Los Angeles, CA XP000603484,(May 15, 1995),182-189.

Information Technology—Generic Coding of Moving Pictures and Associate Audio: Systems, Recommendation H.222.0, ISO/IEC 13818-1, Nov. 13, 1994.

PCT Int'l Search Report, Int'l App No. PCT/US 02/29091, mailed Apr. 3, 2003.

* cited by examiner

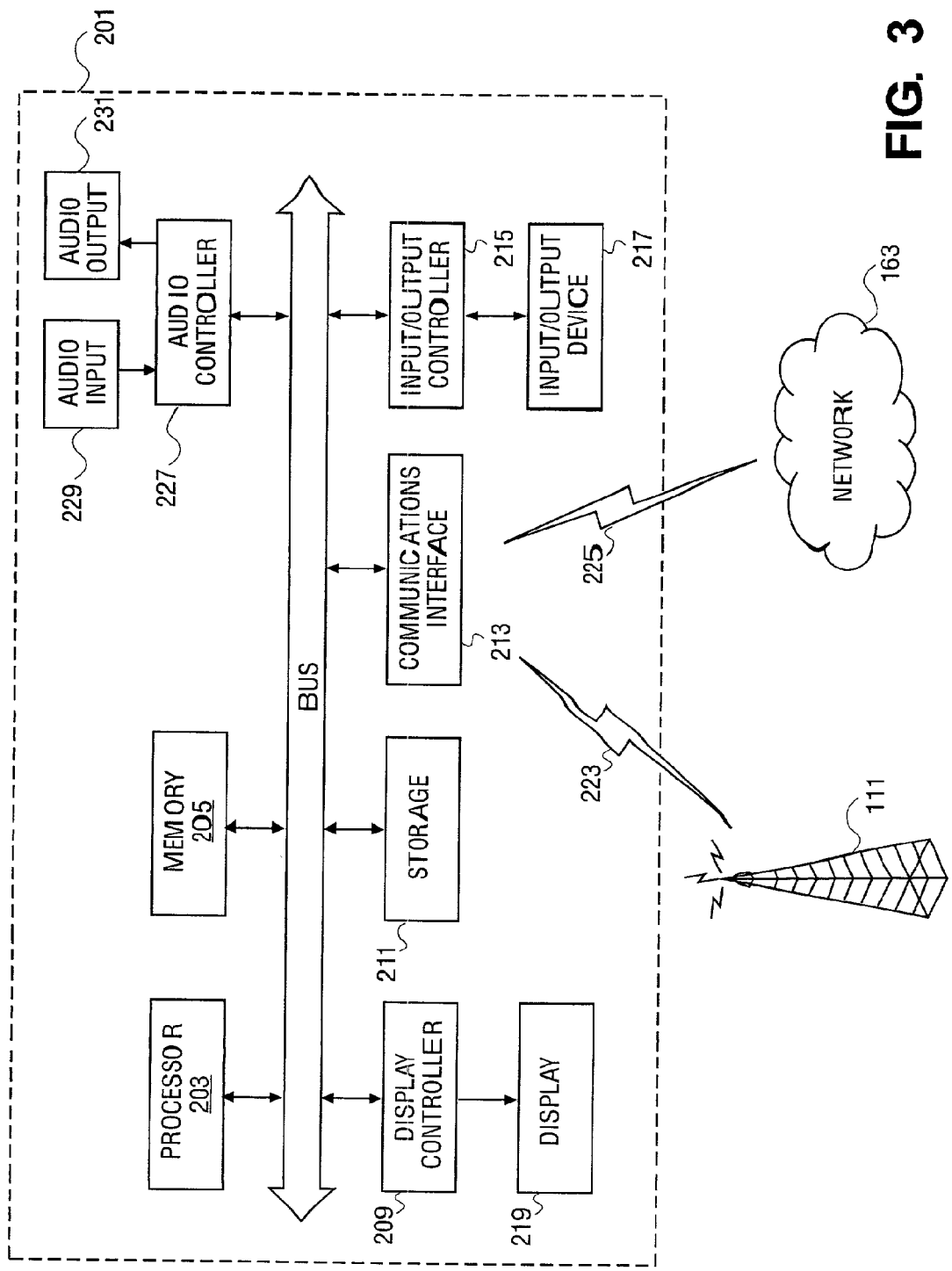

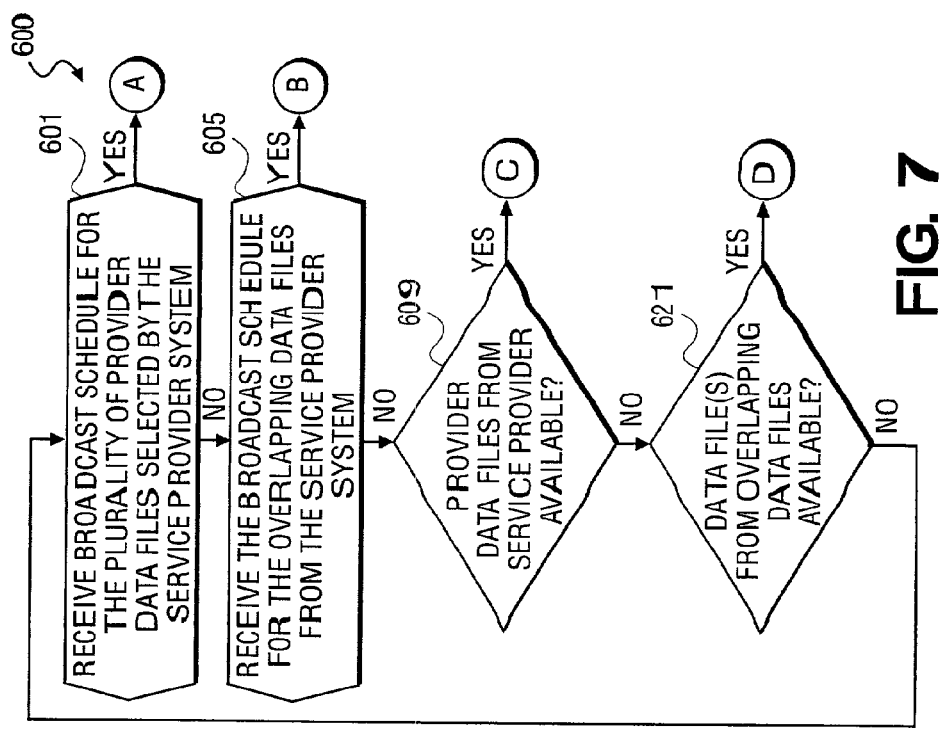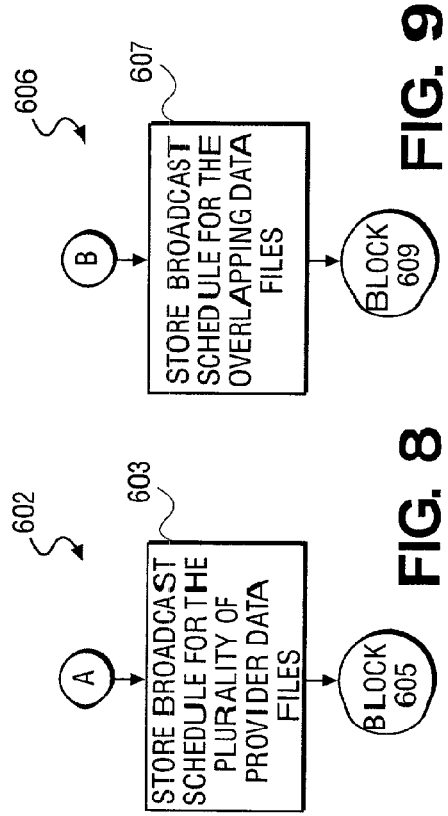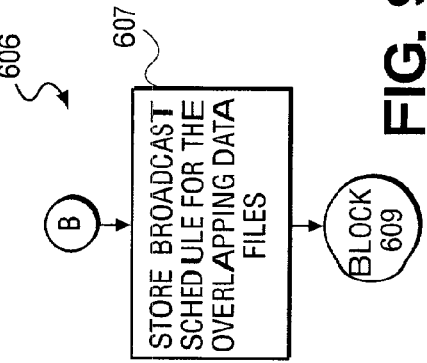

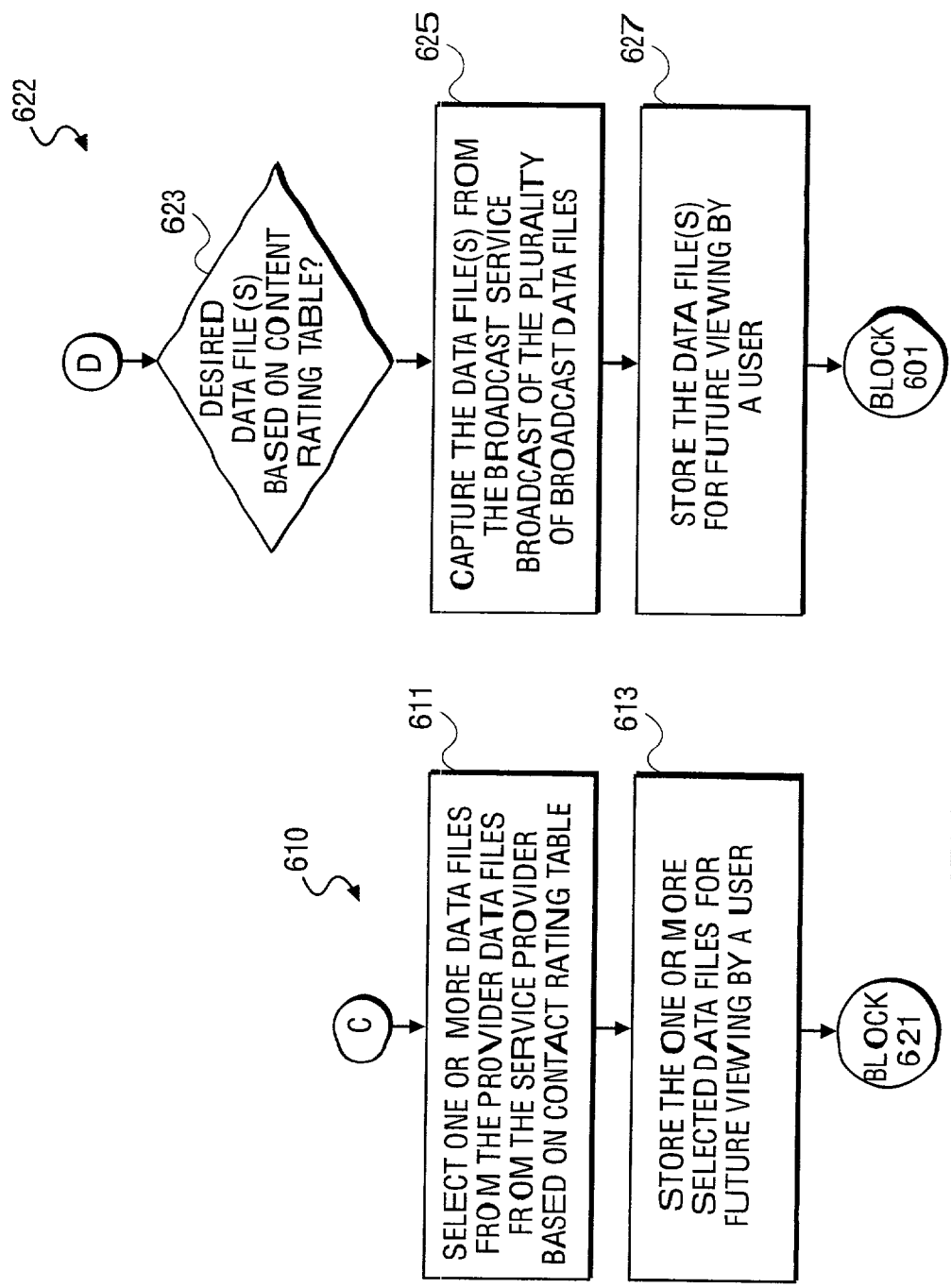

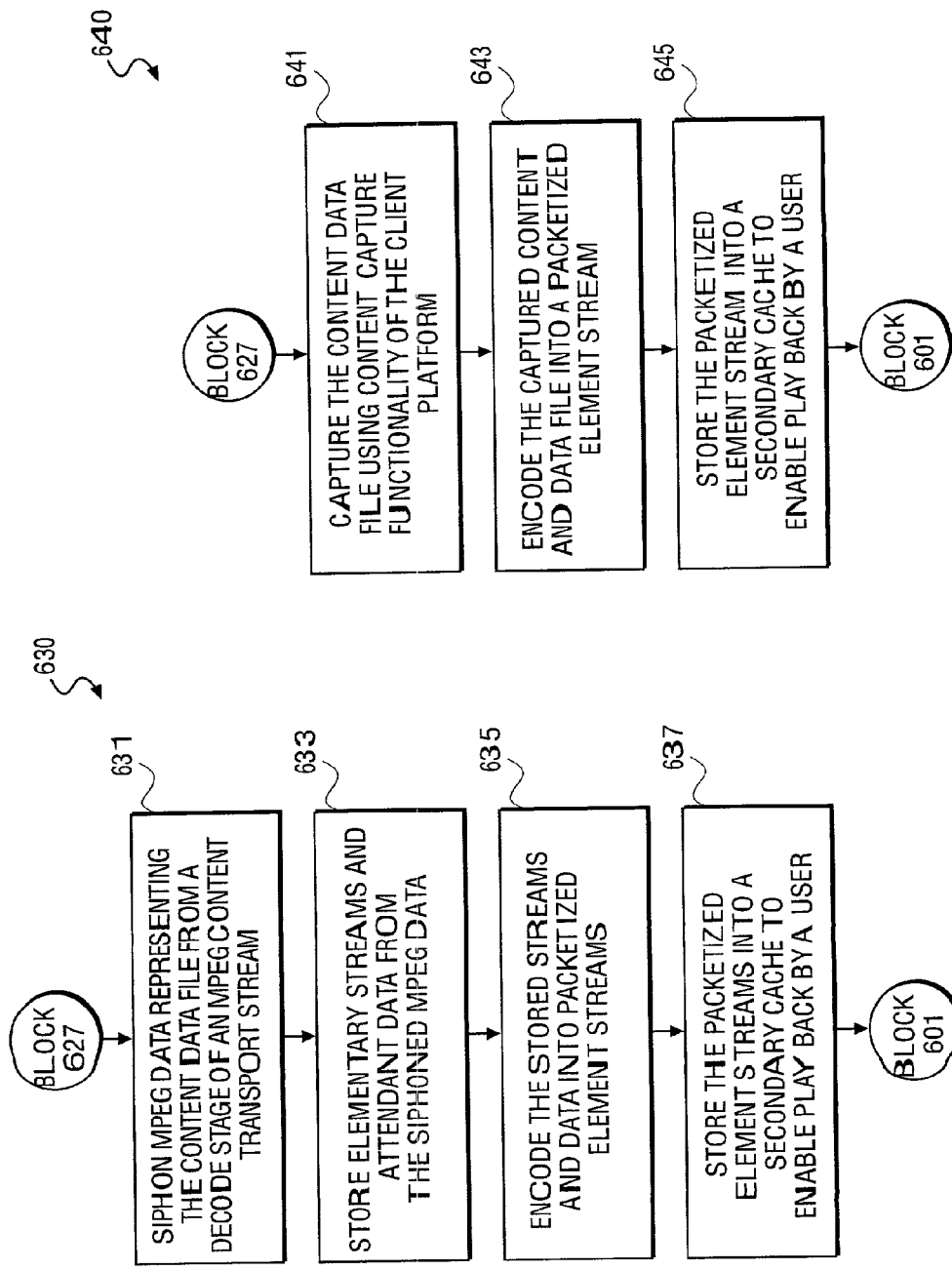

700

| NAME | ACTOR | GENRE |
|---|---|---|
| ACTION DUDE | JOE SMITH | ACTION |
| THE FUNNY SHOW | JANE DOE | COMEDY |
| BLAST 'EM | JANE DOE | ACTION |
| HARDY HAR HAR | JOE SMITH | COMEDY |

| ATTRIBUTE | ATTRIBUTE VALUE | RELEVANCE | BELIEVABILITY |
|---|---|---|---|
| ACTOR | JOE SMITH | 0 | 0 |
| ACTOR | JANE DOE | 0 | 0 |
| GENRE | ACTION | 0 | 0 |
| GENRE | COMEDY | 0 | 0 |

| NAME | RATING | RATING TYPE | IN CACHE | NEXT TREATMENT |
|---|---|---|---|---|
| ACTION DUDE | 0 | N/A | YES | N/A |
| THE FUNNY SHOW | 0 | N/A | YES | N/A |
| BLAST 'EM | 0 | N/A | YES | N/A |
| HARDY HAR HAR | 0 | N/A | NO | N/A |

FIG. 18

| NAME | CLASSIFICATION |
|---|---|
| ACTION DUDE | RECEIVE |
| THE FUNNY SHOW | REFUSE |
| BLAST 'EM | N/A |
| HARDY HAR HAR | N/A |

FIG. 19

| ATTRIBUTE | ATTRIBUTE VALUE | RELEVANCE | BELIEVABILITY |
|---|---|---|---|
| ACTOR | JOE SMITH | -1 | 0 |
| ACTOR | JANE DOE | -1 | 0 |
| GENRE | ACTION | -1 | 0 |
| GENRE | COMEDY | -1 | 0 |

FIG. 20

| ATTRIBUTE | ATTRIBUTE VALUE | RELEVANCE | BELIEVABILITY |
|---|---|---|---|
| ACTOR | JOE SMITH | -1 | 1 |
| ACTOR | JANE DOE | -1 | 0 |
| GENRE | ACTION | -1 | 1 |
| GENRE | COMEDY | -1 | 0 |

FIG. 21

| NAME | RATING | RATING TYPE | IN CACHE | NEXT TREATMENT |
|---|---|---|---|---|
| ACTION DUDE | 1 | EXPLICIT | YES | REPLACE |
| THE FUNNY SHOW | 0 | EXPLICIT | YES | REPLACE |
| BLAST 'EM | 0.5 | IMPLICIT | YES | KEEP |
| HARDY HAR HAR | 0.5 | IMPLICIT | NO | CAPTURE |

FIG. 22

| ATTRIBUTE | ATTRIBUTE VALUE | RELEVANCE | BELIEVABILITY |
|---|---|---|---|
| ACTOR | JOE SMITH | -1 | 1 |
| ACTOR | JANE DOE | -1 | -1 |
| GENRE | ACTION | 2 | 2 |
| GENRE | COMEDY | -1 | 0 |

FIG. 23

METHOD AND APPARATUS FOR COMBINING BROADCAST SCHEDULES AND CONTENT ON A DIGITAL BROADCAST-ENABLED CLIENT PLATFORM

FIELD OF THE INVENTION

The present invention relates generally to broadcast systems. In particular, the present invention relates to a method and apparatus for combining broadcast schedules and content on a digital broadcast-enabled client platform.

BACKGROUND OF THE INVENTION

Broadcast systems traditionally transmit data in one direction—from a server system to a plurality of client systems. Users of the client systems typically consume the signals received from the server system as they are broadcast. One paradigm in which users are provided with content on demand involves server systems that broadcast the same data continuously and/or at staggered intervals. Thus if a user desires to consume a particular data file on demand, the user "tunes in" to one of the repeated broadcasts of the data file.

One example of this paradigm can be illustrated with present day "pay per view" movies that are available from cable or satellite television providers. For instance, cable television providers commonly broadcast the same movies repeatedly on multiple channels at staggered intervals. Users that wish to watch a particular movie, "on demand," simply tune in to one of the channels on which the desired movie is broadcast prior to a broadcast time of the movie. Unfortunately, these continuous and repeated broadcasts of the same data or programs results in a very inefficient use of broadcast bandwidth. Bandwidth used to broadcast the same data repeatedly on multiple channels could otherwise be used to broadcast different data.

Another paradigm for providing content on demand in a broadcast system involves a user recording a particular data file and later accessing the data file "on demand. For example, a user can set up his or her video cassette recorder (VCR) to record a desired television program. Later, when the user wishes to watch the television program, "on demand," the user simply plays the earlier recorded program from his or her VCR. Recently, more advanced digital video recorders have become available, which record television broadcasts on internal hard drives instead of the video cassette tapes used by traditional VCRs. However, use of the digital video recorders is similar to traditional VCRs in that the users are required to explicitly set the criteria used (e.g. date, time) to determine which broadcasts are recorded on the internal hard drives.

Another limitation with present day broadcast systems is that it is difficult for most users of the client systems to provide feedback to broadcasters with regard to programming. As an example, many of today's television broadcasters rely upon Neilson ratings to determine broadcast programming and/or scheduling. Neilson ratings are generally based upon only a small sampling of a cross-section of the public. Consequently, most television viewers have relatively little or no impact on broadcast schedules and/or content. In fact, the pay-per view movies available are certainly not based on user feedback. Furthermore, the user does not have a choice as to when to view a pay-per view event, and therefore must be available during the event broadcast date and time.

Therefore, there remains a need to overcome one or more of the limitations in the above-described, existing art.

BRIEF DESCRIPTION OF THE DRAWINGS

The present invention is illustrated by way of example and not limitation in the accompanying figures.

FIG. 3 depicts a block diagram illustrating a computer system representative of a client or a server in accordance with an embodiment of the present invention.

FIG. 7 is a flow diagram illustrating the flow of events performed by a client for storing a selected portion of content data files selected by the service provider broadcast system in accordance with the further embodiment of the present invention.

FIG. 8 is a flow diagram illustrating additional events performed by a client when receiving a broadcast schedule in accordance with a further embodiment of the present invention.

FIG. 9 depicts a flow diagram illustrating additional events performed by a client when receiving a broadcast schedule for overlapping content data files in accordance with the further embodiment of the present invention.

FIG. 10 is a flow diagram illustrating additional events performed by a client when a selected portion of content data files are available from a server in accordance with a further embodiment of the present invention.

FIG. 11 is a flow diagram illustrating additional events performed by a client when receiving overlapping content data files from a broadcast service system in accordance with a further embodiment of the present invention.

FIG. 13 depicts a flow diagram illustrating additional events performed by a client when receiving a selected content data file broadcast from a broadcast service system in accordance with the further embodiment of the present invention.

FIG. 14 is a flow diagram illustrating additional events performed by a client when receiving a selected content data file from the service provider broadcast system in accordance with the further embodiment of the present invention.

FIG. 16 is an illustration of one example of composite content meta-data broadcast by a server in accordance with the teachings of the present invention.

FIG. 17 is an illustration of one example of a content meta-data table updated and maintained by a client in accordance with the teachings of the present invention.

FIG. 18 is an illustration of one example of a content rating table updated and maintained by a client in accordance with the teachings of the present invention.

FIG. 19 depicts a diagram illustrating content data files that are classified by a user in accordance with one embodiment of the present invention.

FIG. 20 depicts a diagram illustrating a content meta-data table that is updated in response to user classifications in accordance with one embodiment of the present invention.

FIG. 21 is a diagram illustrating one embodiment of a content meta-data table that is updated after a user access in accordance with the teachings of the present invention.

FIG. 22 is a diagram illustrating one embodiment of a content rating table that is updated, after a user access, in accordance with the teachings of the present invention.

FIG. 23 is a diagram illustrating another embodiment of a content meta-data table that is updated, after another user access, in accordance with the teachings of the present invention.

DETAILED DESCRIPTION OF THE INVENTION

An apparatus and method for combining broadcast schedules and content on a digital broadcast-enabled client platform are disclosed. In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purpose of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the method of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or other type of media/machine-readable medium suitable for storing electronic instructions. Moreover, the present invention may also be downloaded as a computer program product. As such, the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
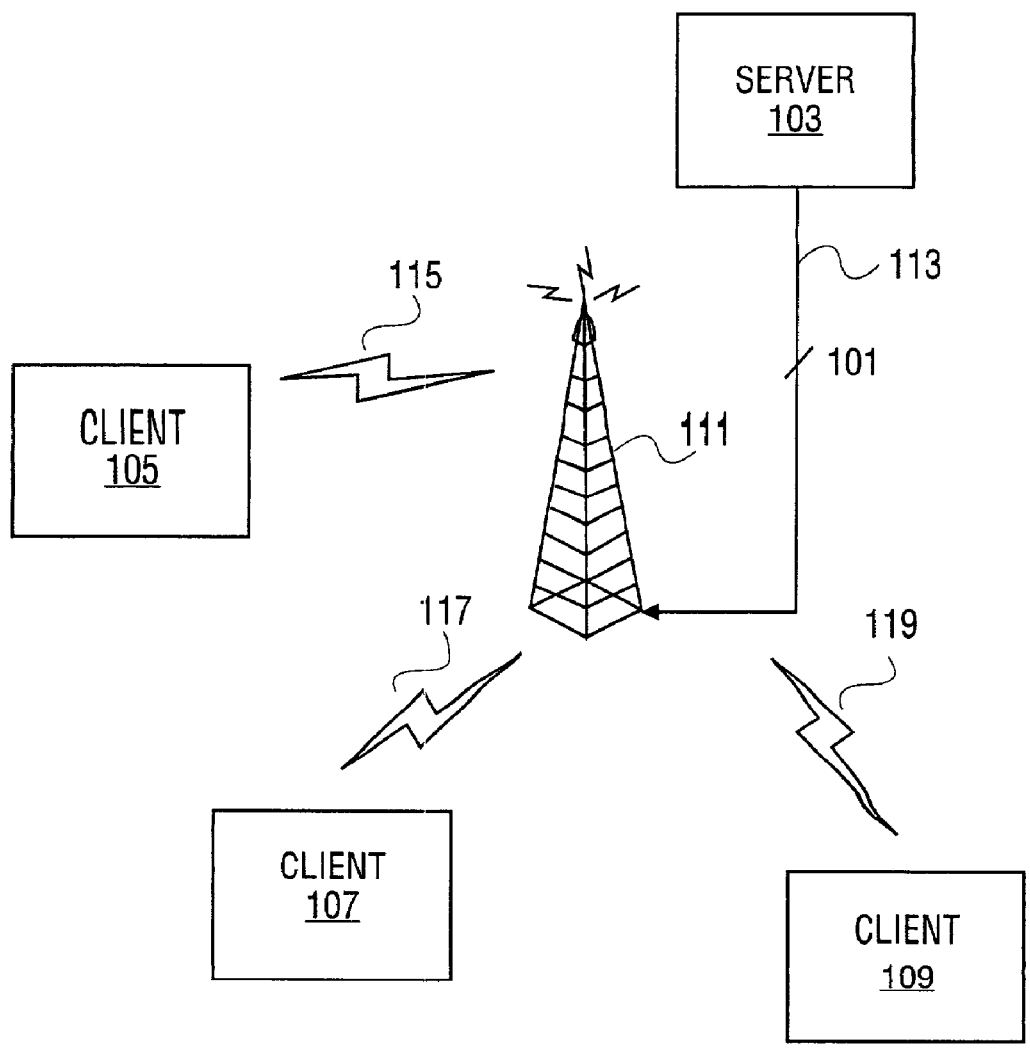
FIG. 1 depicts a block diagram illustrating a broadcast service system as known in the art.

FIG. 1 is an illustration of one embodiment of a conventional broadcast service system 100, as known to those skilled in the art. The broadcast service system 100 includes a server 103 configured to broadcast information 101 to a plurality of clients 105, 107 and 109. Client 105 receives a broadcast from server 103 through a link 115 from a broadcast antenna 111. Similarly, client 107 receives a broadcast from server 103 through a link 117 and client 109 receives a broadcast from server 103 through a link 119 from broadcast antenna 111. Unfortunately, links 115, 117 and 119 are unidirectional wireless radio frequency (RF) links from broadcast antenna 111. Consequently, the broadcast service system 100 lacks the capability for enabling users of the client systems to provide feedback to broadcasters with regard to programming. Moreover, the broadcast service system 100 broadcasts the same data 101 continuously and/or at staggered intervals. Unfortunately, these continuous and repeated broadcasts of the same data or programs 101 results in a very inefficient use of broadcast bandwidth.

Figure 2A:
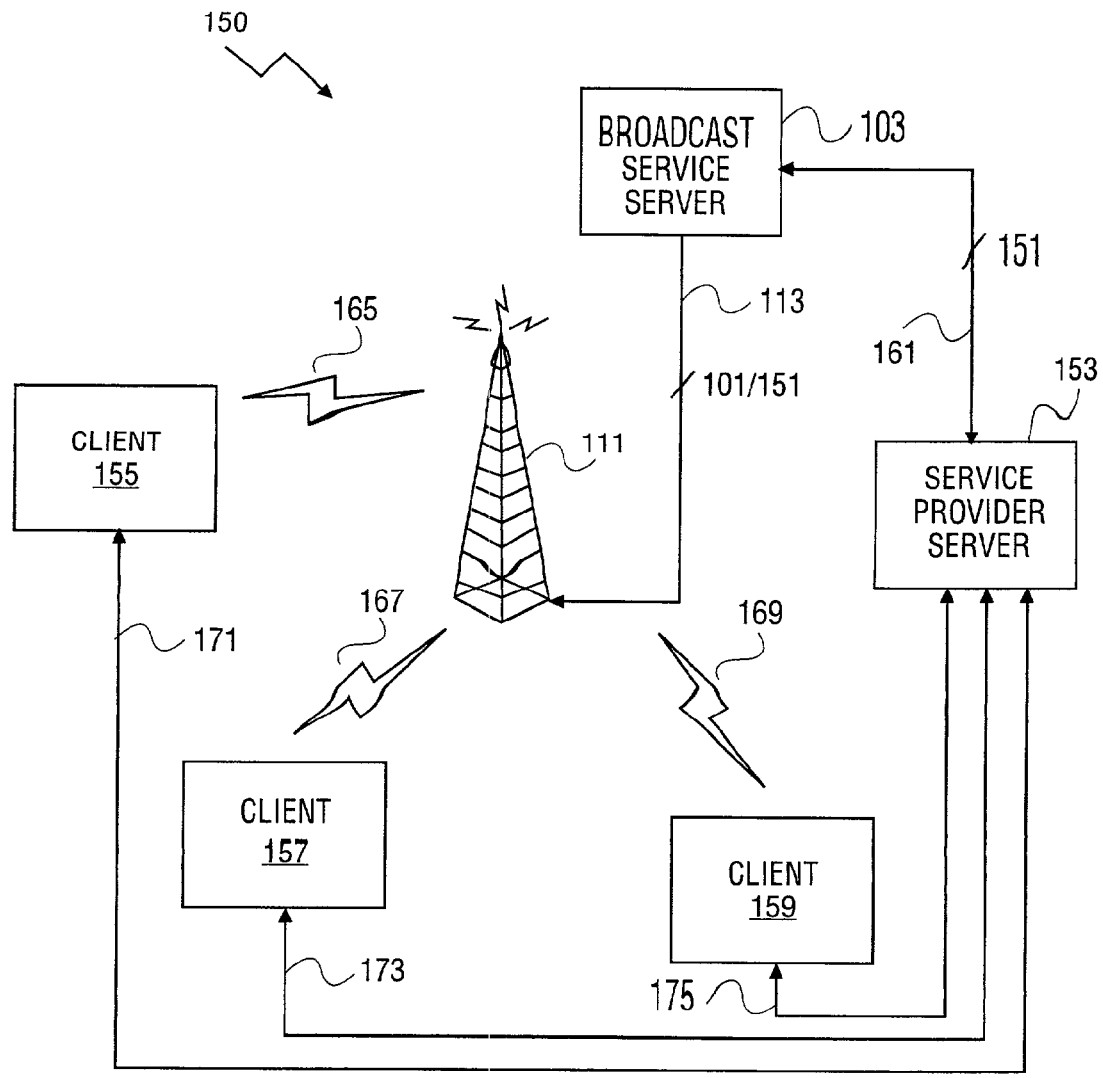
FIG. 2A depicts a block diagram illustrating a service provider broadcast system in accordance with one embodiment of the present invention.

Referring now to FIG. 2A, a service provider broadcast system 150 is depicted. The service provider broadcast system 150 is designed to work in conjunction with a standard broadcast system, such as the broadcast service system 100, as depicted in FIG. 1. As will be described in further detail below, the service provider broadcast system enables companies or broadcast systems who want to optimize pay-per view royalties or subscription fees to combine their existing broadcast content with digital broadcast cached content provided by a service provider broadcast system.

The service provider broadcast system 150 is configured to broadcast information 151 to a plurality of clients 155, 157 and 159, for example, utilizing bandwidth provided by the broadcast service system 100. As such, the service provider broadcast system 150 transmits the information 151 to the broadcast server 103. The service provider information 151 along with the broadcast information 101 is then broadcast, via antenna 111, to the plurality of clients 155, 157 and 159. However, those skilled in the art will appreciate that the broadcast of information, as contemplated by the present invention, includes broadcast via cable, satellite, broadcast antenna or the like, as described in further detail below. Client 155 receives a broadcast from the broadcast server 103 through a link 165 from a broadcast antenna 11. Similarly, client 157 receives a broadcast from the broadcast server 103 through a link 167 and client 159 receives a broadcast from broadcast server 103 through a link 169 from broadcast antenna 111. In this embodiment, links 165, 167 and 169 are uni-direction, wireless radio frequency (RF links) from broadcast antenna 111. The format of such broadcasts is, for example but not limited to, known amplitude modification (AM) or frequency modification (FM)

radio signals, television (TV) signals, digital video broadcasts (DVB) signals, or the like, which are broadcast through the atmosphere.

The broadcast server 103 is configured to broadcast a plurality of broadcast service content data files 101, which may be received by clients 155, 157 and 159. In addition, the broadcast server 103 allocates bandwidth to the service provider server 153 in order to broadcast a plurality of provider content data files 151, which are also received by clients 155, 157 and 159. The content data files 101/151 may include, for example, any combination of a number of different types of files including for example video, audio, graphics, text, multi-media or the like. For purposes of explanation, many of the examples provided in this disclosure assume that the content data files to be broadcast by the server are audio/video files, such as for example movies with moving images and sound. However, it will be appreciated that the content data files broadcast in accordance with the teachings of the present invention are not limited only to audio/video files.

As illustrated in FIG. 1, the broadcast service system 100 includes a one-way or uni-directional link between the server 103 and clients 105, 107 and 109. However, the service provider broadcast system 150, as depicted in FIG. 2A, includes a "back channel" or communications link between each of client 155, 157 and 159 and the service provider server 153. In particular, the service provider broadcast system 150 shows links 161, 163 and 165, which may be used by clients 155, 157 and 159, respectively, to send information back to service provider server 153, such as providing feedback to broadcasters regarding programming. Although links 161, 163 and 165 are illustrated as direct links between clients 155, 157 and 159 and service provider server 153, it is appreciated that clients 155, 157 and 159 may communicate information to the service provider server 153 through indirect links. Indirect links include, for example, but are not limited to broadcasted wireless signals network communications or the like.

Figure 2B:
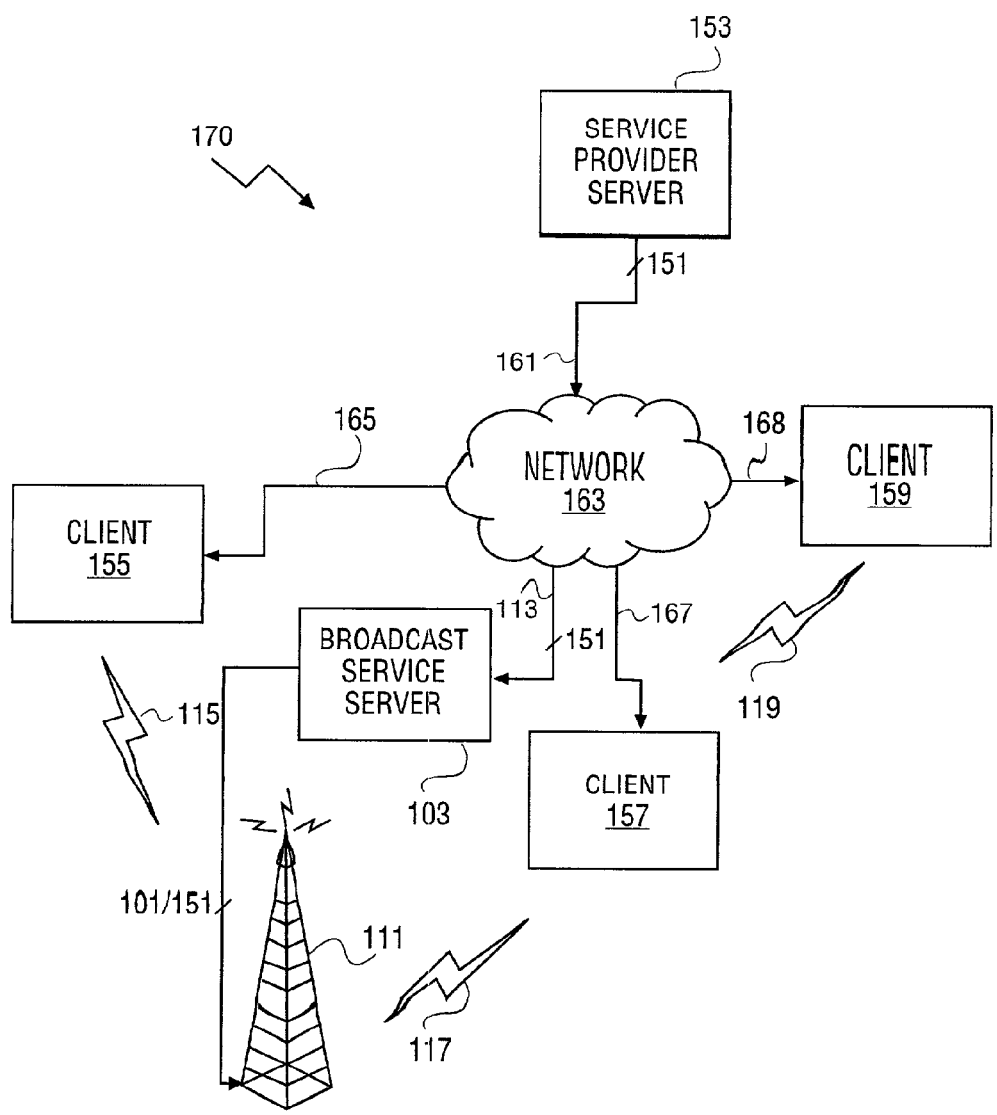
FIG. 2B depicts a block diagram illustrating a service provider broadcast system in accordance with a further embodiment of the present invention.

FIG. 2B is an illustration of a further embodiment of the service provider broadcast system 170 in accordance with the teachings of the present invention. As shown, the service provider server 153 utilizes bandwidth provided by the broadcast server 103 to broadcast information 151 to a plurality of clients 155, 157 and 159 through a network 163. In one embodiment, network 163 may be any type of communications network through which a plurality of different devices may communicate such as for example but not limited to the Internet, a wide area network (WAN), a local area network (LAN), an Intranet, an Extranet or the like.

In the embodiment, client 155 receives information 101/151 broadcast from broadcast server 103 through link 165. Similarly, client 157 receives information 101/151 broadcast from broadcast server 103 through link 167 and client 159 receives information 101/151 broadcast from the broadcast server 153 through link 169. It is noted that links 165, 167 and 169 are shown as uni-directional links from network 163 to clients 155, 157 and 159, in which a back channel, as depicted in FIG. 2A, may be used to communicate information to the service provider server 153. In another embodiment, links 165, 167 and 169 are bi-directional links, which enable clients 155, 157 and 159 to communication information to the service provider server 153.

FIG. 3 is a block diagram illustrating one embodiment of a machine 201 that may be used for the service provider server 153, or clients 153, 155 or 157 in accordance with the teachings of the present invention. The machine 201 is, for example, a computer or a set top box that includes a processor 203 coupled to a bus 207. The machine 201 includes a memory 205, a storage 211, a display controller 209, a communications interface 213, an input/output controller 215 and an audio controller 227 are also coupled to bus 207.

In one embodiment, machine 201 interfaces to external systems through communications interface 213. Communications interface 213 may include, for example, a radio transceiver compatible with AM, FM, TV, digital TV, DVB, wireless telephone signals or the like. Communications interface 213 may also include, for example, an analog modem, Integrated services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

A carrier wave signal 223 may be received by communications interface 213 to communicate with antenna 111. In addition, a carrier wave signal 225 may be received/transmitted between communications interface 213 and network 113. The carrier wave signal 225 may also be used to interface machine 201 with another computer system, a network hub, router or the like. The carrier wave signals 223 and 225 are, for example, considered to be machine readable media, which may be transmitted through wires, cables, optical fibers or through the atmosphere, or the like.

The processor 203 may be a conventional microprocessor, such as, for example, but not limited to an Intel x86 or Pentium family microprocessor, a Motorola family microprocessor, or the like. Memory 205 may be a machine readable medium such as dynamic random access memory (DRAM) and may include static random access memory (SRAM). Display controller 209 controls, in a conventional manner, a display 219, which may be a cathode ray tube (CRT), a liquid crystal display (LCD), an active matrix display, a television monitor or the like. The input/output device 217 coupled to input/output controller 215 may be, for example, a keyboard, disk drive, printer, scanner and other input and output devices, including a television remote, mouse, trackball, trackpad, joystick, or the like. In one embodiment, audio controller 227 control; in a conventional manner audio output 231, which may include for example audio speakers, headphones, an audio receiver, amplifier or the like. In addition, the audio controller may also control, in a conventional manner, audio input 229, which may include for example a microphone or input(s) from an audio or musical device, or the like.

The storage 211 may, for example, include machine readable media such as for example but not limited to a magnetic hard disk, a floppy disk, an optical disk, a smart card or another form of storage for data. Alternatively, the storage 211 may include, for example, removable media, read-only media, readable/writable media or the like. Some of the data may, for example, be written by a direct memory access process into memory 205 during execution of software in computer system 201. It is appreciated that software may reside in storage 211, memory 205 or may be transmitted or received via modem or communications interface 213. For the purposes of the specification, the term "machine readable medium" shall be taken to include any medium that is capable of storing data, information or encoding a sequence of instructions for execution by processor 203 to cause processor 203 to perform the methodologies of the present invention. The term "machine readable medium"

shall be taken to include, but is not limited to solid-state memories, optical and magnetic disks, carrier wave signals, and the like.

Figure 4:
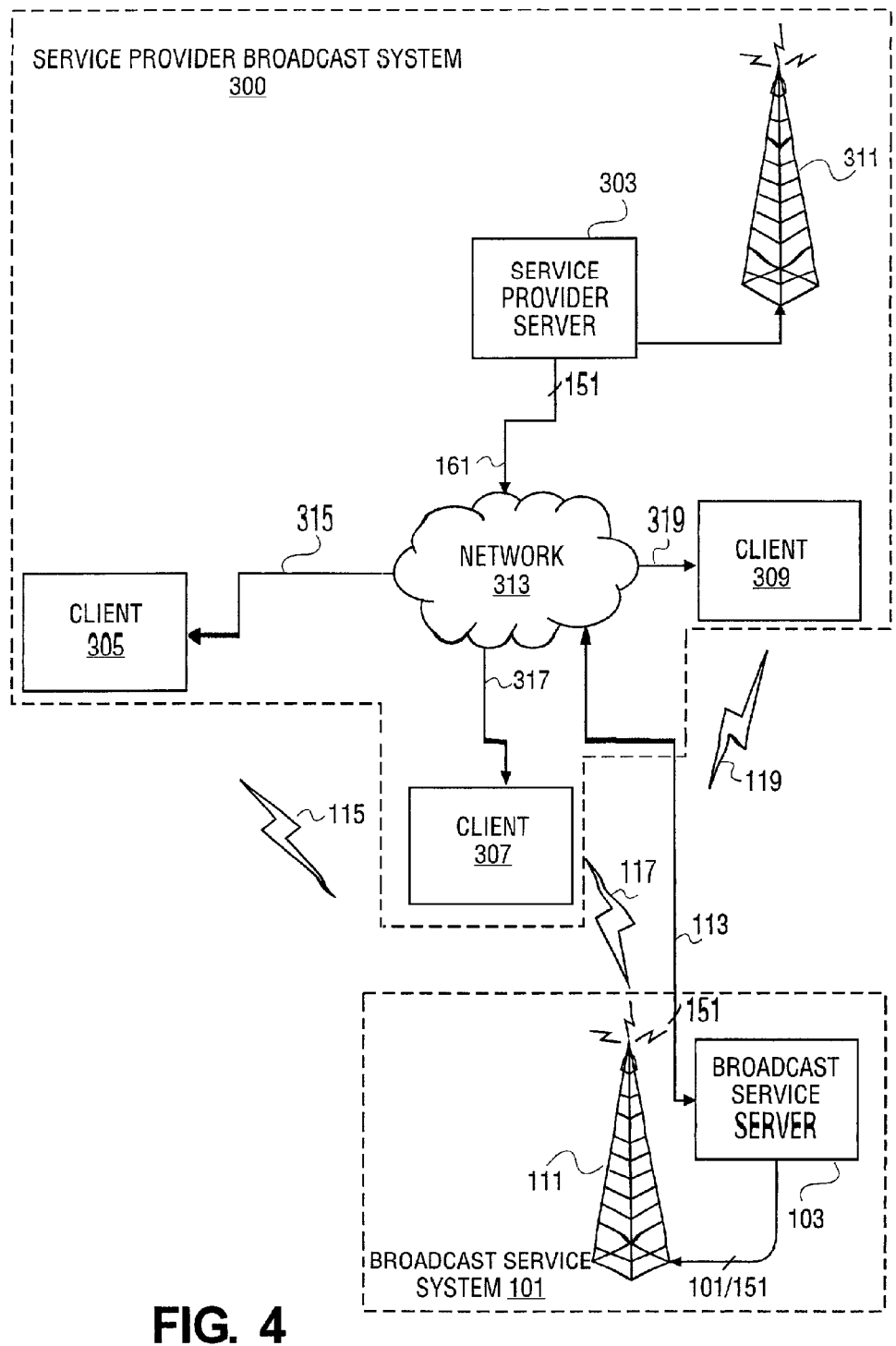
FIG. 4 depicts a block diagram illustrating a service provider broadcast system in accordance with an exemplary embodiment of the present invention.

Referring now to FIG. 4, one embodiment of a service provider broadcast system 300, such as illustrated in FIGS. 2A and 2B, is depicted. In one embodiment, the service provider broadcast system 300 is configured to have a service provider server 303 broadcast the provider content data files 151 to a plurality of clients 305, 307 and 309 utilizing bandwidth provided by a broadcast server 103. The service provider broadcast system 300 utilizes broadcast service content 101 broadcast by a broadcast service system, such as the broadcast service system 100 depicted in FIG. 1, in order to select the provider content data files 151 broadcast to the clients 305, 307 and 309.

As described above, the broadcast service system 100 generally broadcasts the same content continuously and/or at staggered intervals to the system's clients, 105, 107 and 109 (FIG. 1). In one embodiment, the service provider broadcast system 300 utilizes network service information, which describes the content the broadcast service system 100 will be broadcast over a predetermined period to generate a composite broadcast schedule or composite content meta-data set. In an alternative embodiment, the client systems 305, 307 and 309 generate the composite broadcast schedule utilizing the network service information for the broadcast service system 100 and network service information for the service provider system 300, which describes a plurality of service provider content data files available from the service provider system 300. The content meta-data describes the plurality of service provider content data files available from the service provider system 300 as well as the broadcast service content data files 101.

In general, meta-data can be considered as a set of descriptors or attribute values that describe content or data files to be broadcast or potentially broadcast from servers 303 and 103. In this embodiment, once the composite content meta-data set is formed, the service provider broadcast system 300 broadcasts the composite content meta-data set to clients 305, 307 and 309 and receives feedback from the users of the client system regarding the content data files described by the content meta-data. Using this information, the service provider broadcast system 300 ranks the service provider content data files and the broadcast service content data files 101. Alternatively, the system 300 may rank the data files based on box office returns, public opinion polls, movie awards (e.g., the Academy Awards), user requests or the like. Once ranked, the system 300 selects a portion of the content data files having, for example, a higher ranking.

The selected portion of the service provider content forms the content provider content data files 151 that the system 300 broadcasts to the clients 305, 307 and 309 via the broadcast server 103. The client systems 305, 307 and 309 will then store one or more content data files from the provider content data files 151, However, in order to direct the client system 305, 307 and 309 to store one or more content data files from the selected portions of the broadcast service content, the system 300 generates a selected broadcast service content schedule. In an alternative embodiment, the client system determines the selected broadcast service content broadcast schedule based on network service information for the broadcast service system 100 and network service information for the content provider content data files 151. Procedural methods for performing the teaching of the present invention are now described.

Operation

Figure 5:
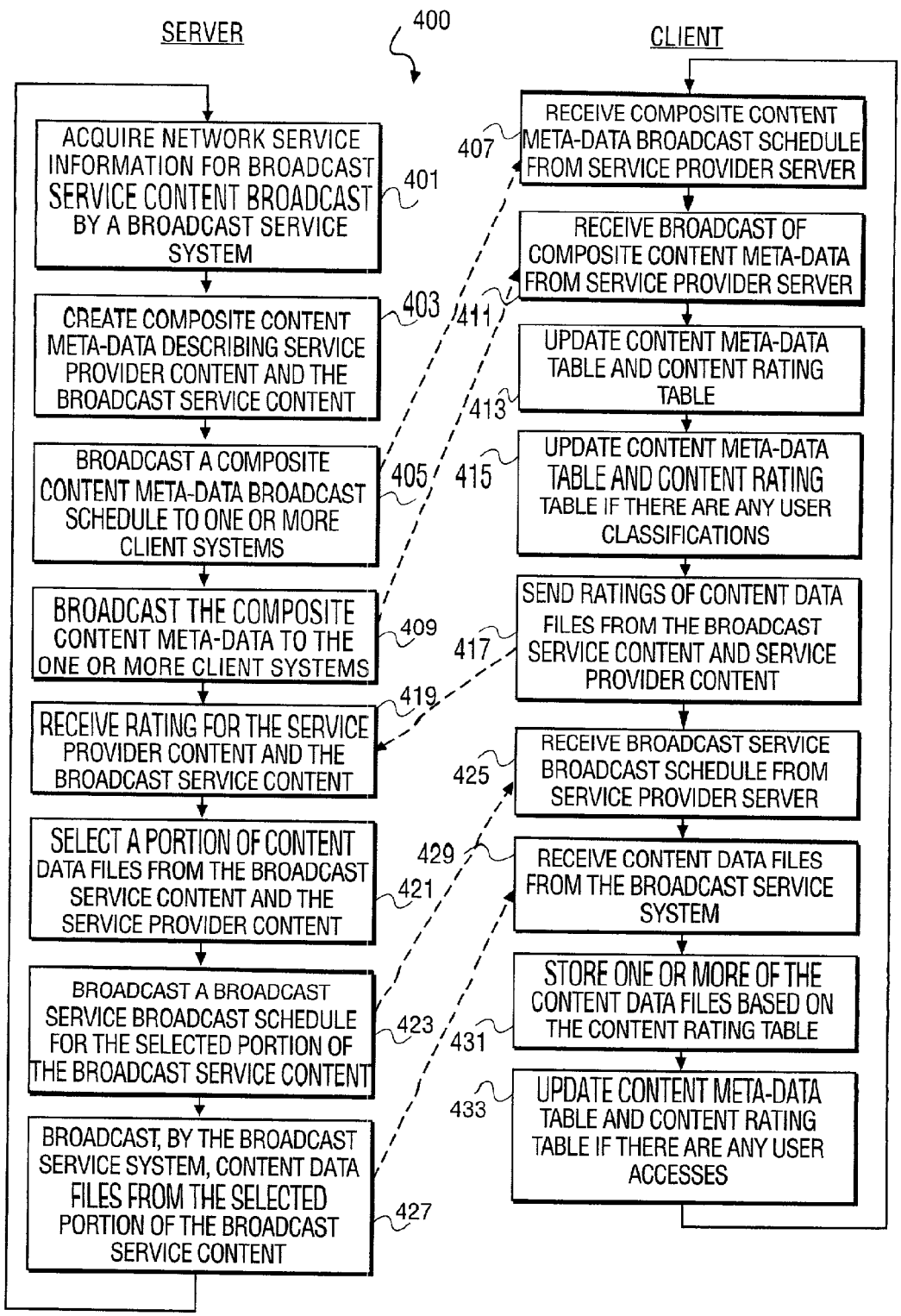
FIG. 5 depicts a flow chart illustrating the flow of events in a server and a client when combining broadcast schedules and content on a digital broadcast enabled client platform in accordance with an embodiment of the present invention.

FIG. 5 depicts a flow diagram illustrating the flow of events performed in a server and a client of a service provider broadcast system 300, for example, as depicted in FIG. 4, for combining broadcast schedules and content on a digital broadcast-enabled client platform. As known to those skilled in the art, digital broadcast networks (whether satellite, cable or terrestrial) make use of service information (SI) to announce the availability of, and acquisition parameters, for content. Typically, these announcements are consumed by a receiver's electronic program guide (EPG), and are used to present and acquire programming. In this environment, premium content (e.g., "Pay-Per-View", HBO, etc.) may be scattered across the spectrum presented by the EPG. This problem is exacerbated by the introduction of additional broadcasting services, such as cached content service providers that also deal in the distribution of (possibly overlapping) content that may or may not be directly integrated into a broadcast service network's SI. Therefore, in order to reduce the cognitive load placed on users, cached content service providers can become aware of the broadcast service network service information, preferably in a pre-processed (i.e., pre-EPG state) in order to generate a composite content listing.

Consequently, at process block 401, a service provider server 303 acquires network SI regarding broadcast service content to be broadcast by a broadcast service system, for example, as depicted in FIGS. 1 and 4, over a predetermined period of time. At process block 403, a composite content list or composite content meta-data set is created. The composite content meta-data set includes meta-data describing service provider content available from the service provider system 300 and the broadcast service content to be broadcast by the broadcast service system 100.

In one embodiment, the creation of the composite content list requires the exclusion of certain content data files that fall into one or more predetermined categories. In certain embodiments, the predetermined categories may include sports programs and events, television programs, news or other repeating broadcasts. However, the service provider broadcast system may include rating an eventual broadcast of such programs. As such, non-excluded programs are then tagged with additional SI attributes. Presumably, these attributes will include a key that can be cross-referenced with data available to the service provider broadcast system. As such, the keys serve the dual purpose of identifying desirable content while simultaneously facilitating the identification of potentially duplicate content. As part of the creation of the composite content list, all duplicate programs are identified and flagged for future reference. In one embodiment, the predetermined period of time during which network SI for the broadcast service content is acquired is, for example, two weeks.

As referred to herein, a cached content service provider describes a broadcast system wherein the system selects one or more data files to broadcast to one or more client system based on feedback generated by the client system in response to user access of data files. Once the one or more data files are selected, the data files are broadcast to the one or more client systems, which selectively store the one or more of the data files based on rankings of the data files contained in a content rating table. The data files are stored by the client systems in order to enable viewing at a later date and time by a user. This cached content service is provided by the service provider broadcast system 300, as depicted in FIG. 4.

However, the service provider broadcast system 300 can be utilized to broadcast content in conjunction with the broadcast service system 100 as depicted in FIGS. 1 and 4. Consequently, content selected by the service provider broadcast system 300, for example, in response to client rankings, is transmitted to one or more client systems using bandwidth provided by the broadcast service system 100. However, in order to best utilize bandwidth provided by the broadcast service system 100, the service provider broadcast system 300 generates a composite broadcast schedule or a composite content meta-data set in order to receive rankings for the service provider content data files, as well as the broadcast service content data files 101. In an alternative embodiment, the client systems 305, 307 and 309 generate the composite broadcast schedule utilizing the network service information for the broadcast service system 100 and network service information for the service provider system 300, which describes the plurality of service provider content data files available from the service provider system 300.

By using the composite content meta-data set, the system 300 can receive rankings for both the service provider content data files, as well as the broadcast service data files. Using the rankings, the system 300 can select a portion of the content data files, described by the composite content meta-data set, to form a composite content schedule describing the selected portion of content data files. Alternatively, the system 300 may rank the data files based on box office returns, public opinion polls, movie awards (e.g., the Academy Awards), user requests or the like. However, the selected portion of content data files may contain duplicate data files. As referred to herein, duplicate data files are date files that are available from the service provider system 300 and that will also be by the broadcast service system 100 will broadcast over the predetermined period of time. Consequently, the service provider broadcast system 300 can determine whether to broadcast these duplicate content data files using its own bandwidth or await a future date and time for broadcast of the duplicate content data files by the broadcast service system 100.

At process block 405, the service provider server 303 may broadcast a composite content meta-data broadcast schedule to the one or more clients. In one embodiment, the meta-data broadcast schedule indicates some point in the future when the actual meta-data is going to be broadcast by the server. Alternatively, the client systems may use known ports such as, for example, those used in the DVB, service advertising protocol (SAP) or the like, to listen for upcoming service announcements from the server. Otherwise, program and system information protocol (PSIP) tables are acquired by decoding a stream (identified by a well-known PID) that has been multiplexed into the MPEG-2 transport stream to listen for upcoming service announcements from the server.

Otherwise, each client 305, 307 and 309 can contain a known scheduling service, which accepts requests to wake up, or be activated, at a specific time to receive the information broadcast by the server. This scheduling service enables the client to wake up at a specified time and select a specified service. For example, in one embodiment, this selection process can be accomplished by tuning to a specific frequency, such as for example in an Advanced Television Systems Committee (ATSC) or a DVB transponder or the like. The selection process can be based on a set of data, such as for example multi-cast Internet protocol (IP) addresses, which define a service.

At process block 407 client systems may receive the composite content meta-data broadcast schedule from the service provider server 303. In one embodiment, client systems 305, 307 and 309 capture and process this pre-broadcast information in order to determine when to wake-up and receive content, where to receive the content and which content to receive. Alternatively, when the meta-data broadcast schedule is received by the client, a registered application in the client is notified to receive the meta-data broadcast schedule.

At process block 409 the composite content meta-data may be broadcast from the server to the clients at the time specified in the composite content meta-data broadcast schedule. At process block 411, the client may receive the broadcast of content meta-data from the server. At process block 413, the client system may then update a content meta-data table and a content rating table. In one embodiment, a meta-data table and a content rating table are updated and maintained internally or locally by each client system. In addition, a user of the client system may optionally classify any one or more of the content data files that are described by the received composite content meta-data. As will be discussed, the content meta-data table and content rating table are updated by the client if there are any user classifications. This is shown in FIG. 5 with process block 415.

At process block 417, the client then sends the ratings of the content data files to the server. In one embodiment, each client in the broadcast network sends the ratings for all of the content data files that are described by the composite content meta-data broadcast earlier from the server. Alternatively, each client sends all or part of the content rating table maintained on the client system.

At process block 419, the server may receive the ratings of the content data files from the client(s) 305, 307 and 309. At process block 421, the server then selects a portion of the content data files from the service provider content and broadcast service content having, for example, the highest ratings as determined by the client systems. Alternatively, the system 300 may rank the data files based on box office returns, public opinion polls movie awards (e.g., the Academy Awards), user requests or the like. In one embodiment, the server includes processing to aggregate all of the ratings received from the clients. Consequently, the content data files are sorted according to the aggregated ranking. As a result, the server broadcasts the most appropriate or relevant data files for the customer base or clients.

In one embodiment, the data files to broadcast, and/or the broadcast schedule are determined dynamically by the server in response to the ratings received from the client(s) in accordance with teachings of the present invention, Therefore, in one embodiment, broadcast schedules can change over time depending on which data files are available from the server and which content or data files are accessed and/or classified by the clients.

At process block 423 the service provider broadcast system 300 generates a broadcast schedule for content data files contained within the selected portion of broadcast service content, which will not be broadcast by the service provider broadcast system 300 as the provider content data files 151. A selected broadcast service content broadcast schedule is then broadcast to the one or more client systems as shown in block 423. Process block 425 shows that the client systems then receive the broadcast service broadcast schedule from the server.

In one embodiment, the clients wake-up to receive the selected broadcast service content broadcast schedule from the server. The broadcast schedule indicates, for example, a future time in which selected content data files will be broadcast by the broadcast service system 100. At process block 427, the content data files from the selected portion of the broadcast service content are then broadcast from the broadcast service system 100 to the clients at the time specified in the broadcast schedule. Process block 429 shows that the client receives the broadcast of contents data file broadcast from the broadcast service system 100. In one embodiment, process block 431 shows that client-side filtering is provided by the client selectively storing content data files according to the content rating table as the content data files are broadcast over the predetermined period. In another embodiment, client-side filtering is provided by the client selectively waking up to selectively receive and store content data files broadcast from the broadcast service system according to the content rating table.

Process block 433 shows that the client then updates the content meta-data table and content rating table if there are any user accesses of the stored data files. As described herein, a user access may include a user interacting with, viewing, watching, listening to, reading, consuming, etc., a data file. For instance, one example of a user accessing a data file may be the user watching a particular movie or listening to a particular song provided by one of the stored data files in client. In one embodiment, a user access will result in the meta-data table and content rating table on the client being updated locally.

Figure 6:
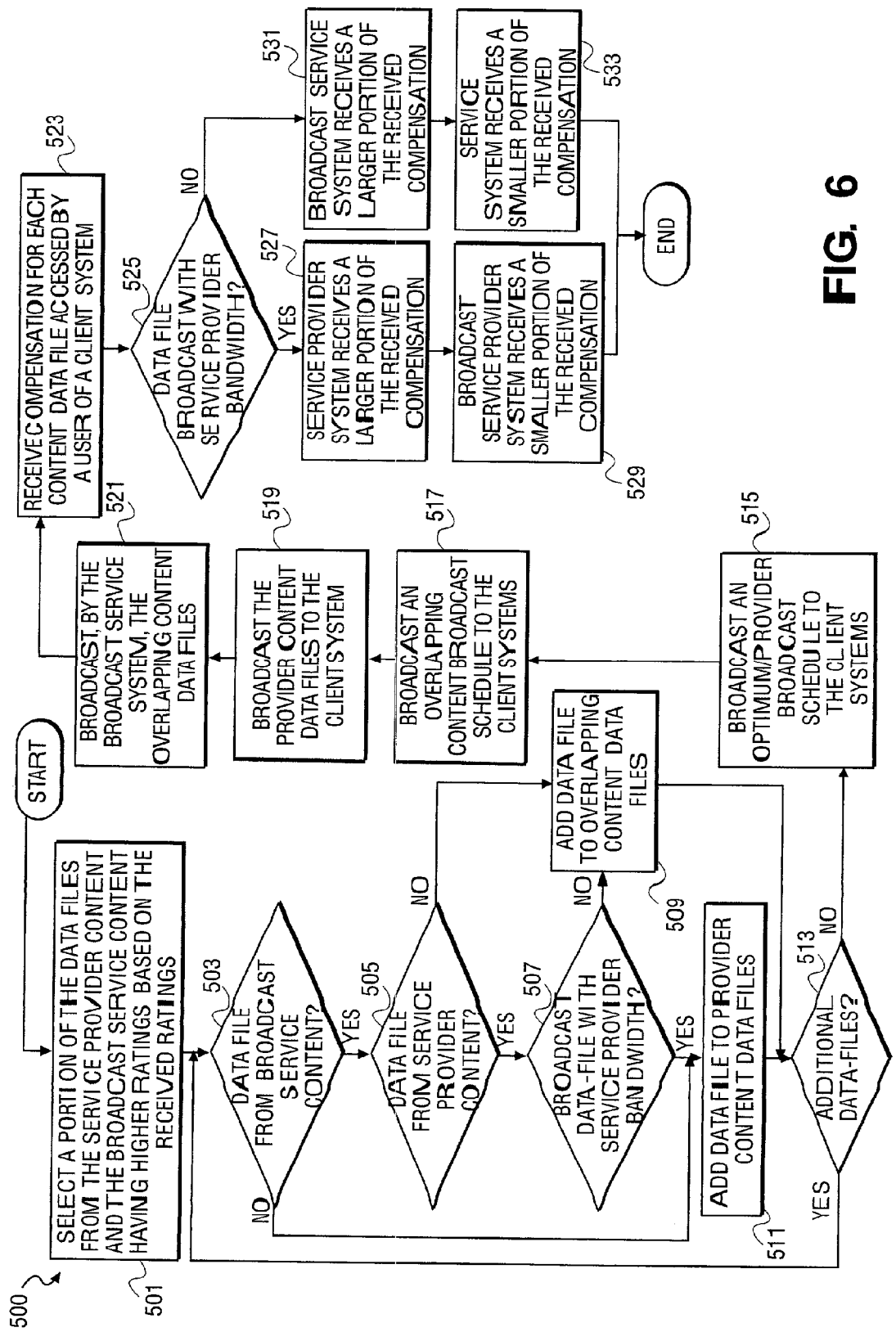
FIG. 6 depicts a flow diagram illustrating the flow of events in a server when combining existing broadcast content with cached content in order to generate an optimized broadcast schedule to reduce broadcast bandwidth in accordance with an embodiment of the present invention.

FIG. 6 depicts a more detailed flow chart illustrating the selection of the plurality of provider content data files 151 that are broadcast to one or more client systems by the service provider broadcast system, for example, as depicted in FIG. 4. At process block 501, the service provider server 303 selects a portion of the service provider content data files and the broadcast service content data files 101 having higher rankings based on the rankings received from the one or more client systems (selected provider/broadcast content). However, duplicate content data files within both the selected portion of service provider content and broadcast service content should not be broadcast by both the broadcast service provider system 300 as well as the broadcast service system 100.

Consequently, at process block 503, it is determined whether a selected content data file is contained in the selected portion of the broadcast service content. If the selected content data file is contained within the selectively selected portion of broadcast service content, at process block 505 it is determined whether the selected data file is also contained within the selected portion of service provider broadcast content. If the selected content data file is not contained within the service provider content, at step 509 the selected content data file is added to a set of overlapping content data files.

Otherwise, at step 507, it is determined whether the selected content data file should be broadcast using service provider bandwidth. (Broadcast by the service provider broadcast system 300). If the selected content data file will be broadcast with the service provider bandwidth, at process block 511, the selected content data file is added to a set of provider content data files 151. At process block 513, steps 503 through 511 are repeated for each content data file within the selected portion of service provider content and broadcast service content. As such, steps 503 through 513 allow the service provider system to determine whether duplicate or overlapping files should be broadcast using service provider bandwidth or broadcast service system bandwidth (broadcast by the broadcast service system 100).

At process block 515, the service provider broadcast server 300 broadcasts an optimum/provider broadcast schedule prior to broadcast of the provider data files 151. The provider data files 151 will each be broadcast to the one or more client systems as a group in order to enable storage of the provider data files 151 based, for example, on client system content rating tables. However, the overlapping data files may be broadcast at various times, depending on the broadcast service system 100 broadcast schedule. Accordingly, at process block 517, the service provider server 303 broadcasts a selected broadcast service content broadcast schedule for the overlapping data files prior to broadcast by the broadcast service system 100. Consequently, utilizing the selected broadcast service content broadcast schedule, the one or more client systems can determine whether to store a data file contained within the overlapping data files, once it is available, based on a stored content rating table. In an alternative embodiment, the client system determines the selected broadcast service content schedule based on network service information for the broadcast service system 100 and network service information for the content provider content data files 151.

At step 519, the service provider server 303 broadcasts the provider content data files 151 to the client systems utilizing service provider bandwidth, For example, in an embodiment of the present invention, the service provider broadcast system utilizes bandwidth provided by the broadcast service system 100 in order to broadcast content data files to the one or more client systems via antenna 111. However, the service provider broadcast system 300 may broadcast content data files either via antenna 311 or via network 313. At process block 521, the broadcast service server 103 broadcasts content data files from the overlapping content data files to the one or more client systems. As described above, content data files within the overlapping data files will not be sent as a group. These data files are broadcast at the times scheduled by the broadcast service system 100.

Utilizing a service provider broadcast system in accordance with the teachings of the present invention content available from the broadcast service system 100 may be combined with cached content provided by the service provider broadcast system 300. Consequently, at process block 523, the service provider broadcast system 300 receives compensation for each stored data file accessed by a user. At process block 525, it is determined whether the data file accessed by the user was broadcast to the user using service provider broadcast system bandwidth or broadcast service system bandwidth. When service provider bandwidth is used, at process block 527, the service provider broadcast system 300 receives a larger portion of the compensation, while at step 529, the broadcast service system 100 receives a smaller compensation portion. Alternatively, when broadcast service system bandwidth is used to broadcast a data file, the broadcast service system 100 receives a larger portion of the compensation at process block 525, while at process block 531, the service provider broadcast system 300 receives a smaller compensation portion.

Referring now to FIG. 7, FIG. 7 is a flow diagram illustrating events performed by a client system for selectively storing received content data files. At process block 601, it is determined whether a client system received a broadcast schedule for the plurality of provider data files 151 selected by the service provider broadcast system 300. At process block 602, once the broadcast schedule is received, the client system stores the broadcast schedule for the plurality of provider content data files 151 (FIG. 8). At process block 605, it is determined whether a broadcast schedule for the overlapping content data files was received from the service provider system 300.

At process block 607, the client system stores a selected broadcast service content broadcast schedule for the overlapping content data files (FIG. 9). At process block 609, it is determined whether the provider content data files 151 are available. At process block 611, the client selects one or more content data files from the provider data files 151 based on a content rating table (FIG. 10). Generally, the provider content data files selected by the service provider system 300 will include content data files which received an overall popularity rating from the one or more client systems. However, each user of the client system will be different and will generally select a subset of the content data files within the provider content data files 151. Once selected, at process block 613, the client stores the one or more selected content data files for future viewing by a user (FIG. 10).

At process block 621, it is determined whether content data files from the overlapping data files are available. At process block 623, it is determined whether a content data file, available from the overlapping data files, is desired by the client system based on the content rating table (FIG. 11). As described above, content data files contained within the overlapping content data files may have various broadcast dates and times. Consequently, the client systems will utilize the broadcast schedules to, for example, activate during the availability date and time of the content data file, assuming the content data file is desired by the client system. At process block 625, the client system captures the content data file from the broadcast service broadcast of the broadcast data files 101 (FIG. 11). At process block 627, the client system stores the content data files for future viewing by a user (FIG. 11).

Figure 12:
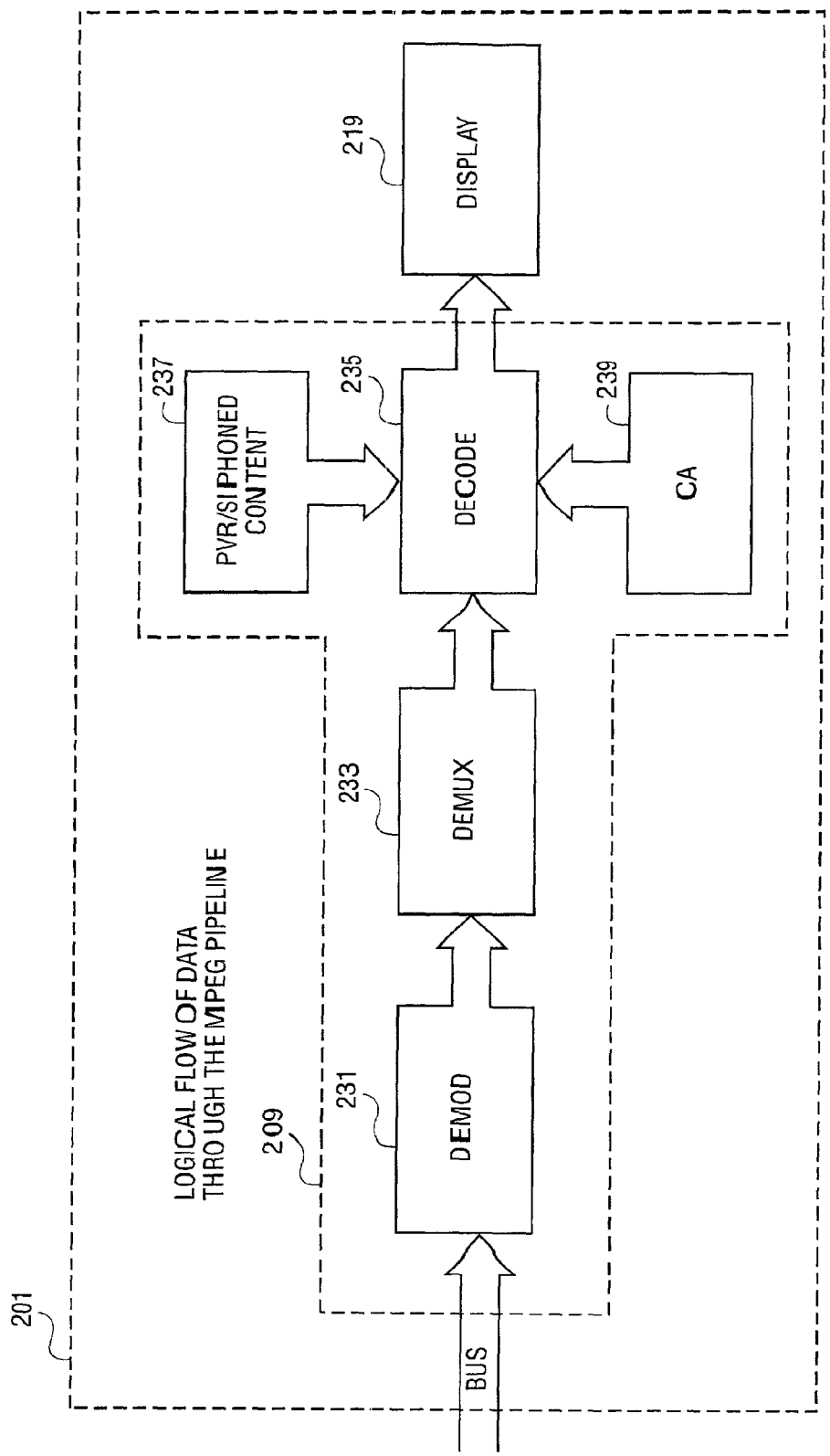
FIG. 12 is a block diagram depicting the machine illustrated in FIG. 3 configured as a set-top box to illustrate the logical flow of data through an MPEG pipeline in accordance with an embodiment of the present invention.

Referring now to FIG. 12, the machine 201, as depicted in FIG. 3, is illustrated in a set-top box configuration. This partial block diagram of the machine 201 depicts the display controller 209 and the display 219 to illustrate the logical flow of data through an MPEG (Motion Picture Experts Group) pipeline within the display controller 209. The illustration depicted in FIG. 12 is provided to demonstrate the capture of selected content data files broadcast by both the service provider broadcast system 300 as well as selected content data files broadcast by the broadcast service system 100.

MPEG-2 defines a standard for coding interlaced images at transmission rates above four million bits per second. As known to those skilled in the art, MPEG-2 is generally used for digital TV broadcast and digital versatile disk. The MPEG-2 standard specifies an MPEG transport stream which is a time division multiplexed set of element streams Generally, content is received by the display controller 209 and is demodulated by the demodulation block 231 to determine the original content transport stream. Once demodulated, the content is demultiplexed by demultiplex block 233 to extract the desired element streams. Next, the element streams area decoded at decode block 235 and displayed via display 219.

Generally, the content is decoded into MPEG-2 to streams and displayed on the display device. In addition, stored content data files contained in block 237 may be viewed by a user by being passed to the decode block 235 and displayed on the display 219. Likewise, conditional access (CA) block 239 is utilized in order to provide encryption keys for decoding protected content prior to display on display device 219, for example, to enable pay-per-view viewing of certain content. Unfortunately, depending on the content capture capabilities provided by the various set-top box of the client's systems, the capture of the selected broadcast content will vary depending on the client set-top boxes 201.

FIG. 13 is a flow diagram illustrating the flow of events 630 in a client set-top box when capturing selected broadcast content broadcast by the broadcast service system 100. At process block 631, client software will siphon MPEG data representing the selected content data file from a decode stage 235 of an MPEG content transport stream. At process block 633, client software stores the elementary streams and attendant data from the siphoned MPEG data. At process block 635, client software encodes the stored content streams and data into, for example, packetized element streams. The encoding will generally include service information and file storage information to enable content playback. Finally, at process block 637, the client software stores the packetized element streams into a secondary cache to enable playback by a user of the client system. In an alternative embodiment, the packetized element streams are re-multiplexed into a new MPEG-2 transport stream which is stored in the secondary cache. Consequently, when presenting stored movies to the user, the secondary cache is logically merged with a primary cache to create the illusion of a single unified selection of movies. Upon user selection, the indicated content is retrieved from its specific respective cache and channeled through the platforms MPEG decode pipeline for display via display 219.

FIG. 14 is a flow diagram illustrating the flow of events 640 performed by client software in order to store selected content data files that are captured utilizing content capture capabilities provided by the client system. The content capture capability includes, for example, PVR functionality. At process block 641, content data files are captured using content capture functionality of the client platform. At process block 643, client software encodes the captured content data file into a packetized element stream. At process block 645, the client software stores the packetized element stream into a secondary cache to enable playback by a user. The encoding steps described in FIGS. 13 and 14 are required in order to wrap the resulting or captured streams into a client compatible packaging in order to enable playback of the selected content data files. However, for selected content data files broadcast by the service provider broadcast system 300, the content data files will already be encoded into compatible packaging which is recognized by the client software.

Figure 15:
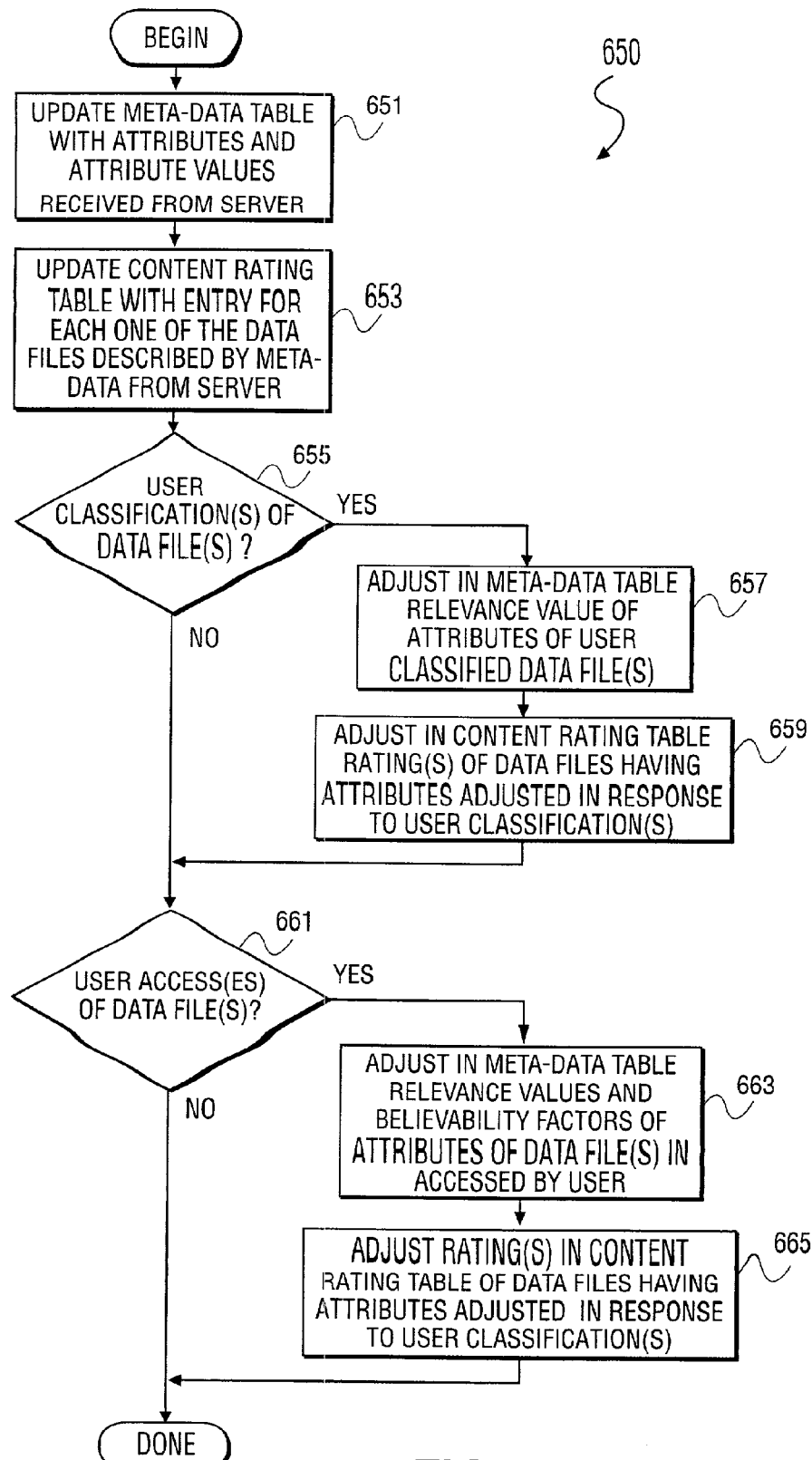
FIG. 15 depicts a flow diagram illustrating the flow of events in a client when processing composite content meta-data broadcast from a server to maintain a content meta-data table and content rating table in accordance with one embodiment of the present invention.

FIG. 15 is a more detailed flow diagram illustrating one embodiment of the flow of events 650 in a client when processing meta-data broadcasted from a server to update and maintain a meta-data table and a content rating table. In particular, process block 653 shows that a content meta-data table is updated with attributes and attribute values included in the content meta-data broadcast from the server. Process block 605 shows that the content rating table is then updated with an entry for each one of the content data files described by the content meta-data broadcast from the server.

To help illustrate the meta-data aspect of the present invention, FIGS. 16–23 illustrate meta-data and content rating tables in accordance with the teachings of the present invention. FIG. 16 is an example of one embodiment of content meta-data 700, which may be broadcast by the broadcast server 103 to the clients 305, 307 and 309. For explanation purposes, it is assumed that the data files broadcast by the broadcast server 103 in this example are audio/video files such as, for example, movies or TV programming. As mentioned above, data files may be other types of files such as for example but not limited to audio, graphics, text, multi-media or the like.

In the illustrated embodiment, meta-data 700 in FIG. 16 shows that four movies, or data files, will be broadcast later by server 103. These movies shown in this example are "Action Dude," "The Funny Show," "Blast 'Em" and "Hardy Har Har." Meta-data 700 includes attributes and attribute values that describe each one of the movies to be broadcast later by server 103. In the example illustrated, two attributes are provided to describe each movie in meta-data 700. The attributes shown in FIG. 16 are "Actor" and "Genre." It is appreciated that other embodiments of the present invention may include different attributes as well as or attributes values. Referring back to the particular example shown in FIG. 16, "Action Dude" is an "action" movie featuring actor "Joe Smith." "The Funny Show" is "comedy" movie featuring actress "Jane Doe." "Blast 'Em" is an "action" movie featuring actor "Jane Doe." "Hardy Har Har" is a "comedy" movie featuring "Joe Smith."

FIG. 17 is an example of one embodiment of meta-data table 800, which is updated and maintained locally by each client 305, 307 and 309. In the illustrated embodiment, meta-data table 800 in FIG. 17 has been populated with the data included in meta-data 700, which was broadcasted earlier from server 103. In one embodiment, meta-data table 800 includes a list of attributes, attribute values and corresponding relevance values and believability factors. In particular, meta-data table 800 includes attribute values "Joe Smith," "Jane Doe," "action," and "comedy."At this time, the relevance values and believability factors for attribute values "Joe Smith," "Jane Doe," "action," and "comedy" are all zero in FIG. 17. As will be shown, in one embodiment, the relevance values and believability factors of the present invention will be updated and maintained as the user interacts with the client system.

In one embodiment, the relevance values in meta-data table 800 are indicators as to how relevant the associated attribute and attribute values are for predicting a particular user's behavior. For instance, the relevance value indicates how likely it is for the user to watch a particular movie because of this particular attribute value, within a range of values such as for example from −10 to 10. In one embodiment, the believability factors in meta-data table 800 are weighting factors to be applied to specific attribute and attribute value pairs when rating or predicting whether a user will actually access a particular data file having that particular attribute value. In one embodiment, believability factors in meta-data table 800 are within a range of values such as for example from −10 to 10.

FIG. 18 is an example of one embodiment of a content rating table 900, which is updated and maintained locally by each client 305, 307 and 309. In the illustrated embodiment, content rating table 900 in FIG. 18 includes a list of the data files described in meta-data 700 as well as any additional data files that are currently stored or cached locally by the client.

In one embodiment, data files may be stored locally by the client in for example memory 205, storage 211 or in a locally accessible network by machine 201 of FIG. 3. For purposes of this disclosure, data files being stored locally by the client may also be interpreted to include a data file stored "locally" by the client in a known network storage configuration, separate from the server. For purposes of this disclosure, the data file being stored or cached locally by the client is to be interpreted as the data file being stored for later access, retrieval or consumption. In one embodiment, the local cache of the present invention is considered to be a first level cache. Thus, the local cache the present invention is sized accordingly to increase the possibility of a single hit.

Assuming an audio/video data file, a movie is stored locally by the client. After a user watches the movie, the storage space occupied by the movie is generally considered to be available for storage of another movie to be broadcast sometime later. If a user has not watched a particular movie, the storage space occupied by that movie is generally considered not to be available for storage of another movie. However, if there is no additional storage space available and a higher rated movie is to be broadcast, the lower rated unwatched movie may be replaced by the higher rated movie. In an alternative embodiment, a user of the client may retain selected stored content data files.

Referring back to the embodiment of content rating table 900 shown FIG. 18, each movie also has an associated rating, a rating type indicator, an in cache indicator and a next treatment indicator. In one embodiment, the rating indicates a rating value for the associated data file. The rating value in one embodiment may either be explicitly input by a user or implicitly generated by the client system by processing meta-data associated with that particular data file. For example, a relatively high rating value predicts that the particular data file may be of interest to the user. Conversely, a relatively low rating value predicts that the particular data file is unlikely to be of interest to the user.

In one embodiment, the in cache indicator indicates whether that particular data file is currently stored or cached locally by the client. In the embodiment illustrated in FIG. 18, the movies "Action Dude," "The Funny Show" and "Blast 'Em" already exist in the local storage of the client system. Conversely, the movie "Hardy Har Har" has not been stored in the local storage of the client system in the example illustrated in FIG. 18.

In one embodiment, the next treatment indicator is used to track future actions to be taken for the particular data file. For example, if a movie has already been watched by the user, the next treatment indicator would indicate "replace" to indicate that the storage space occupied by that particular movie is available for storage of another movie. However, if the movie has not yet been watched by the user, the next treatment indicator would indicate "keep." In addition, if the movie has not seen stored locally by the client and if the rating value predicts that this particular movie may be of interest to the user, the next treatment indicator would indicate "capture." While if the movie has not yet been broadcast by the server and the rating predicts that this movie is unlikely to be of interest to the user, the next treatment indicator would indicate "ignore."

Referring again to FIG. 15, decision block 657 shows that it is then determined whether there is a user classification of any of the data files. Referring briefly to FIG. 16, a user classifies some of the movies, as described by meta-data 700. In particular, the user has expressed interest in the movie "Action Dude" by indicating that he or she wishes to receive that movie. In addition, the user has expressed that he or she does not have any interest in the movie "The Funny Show" by indicating that he or she refuses that movie. However, the user has not provided any information or classification regarding any of the remaining movies.

Referring back to FIG. 15, if the user has classified any of the data files, process block 659 shows that the relevance values of the particular attributes of the classified data files are updated in meta-data table 800. Process block 661 shows that the ratings of data files having attribute values with relevance values that were adjusted in response to the user classification(s) are also adjusted. For example, referring to meta-data table 800 in FIG. 20, the relevance values for attribute values "Joe Smith" and "action" are adjusted to reflect that the user explicitly expressed an interest in "Action Dude." However, if the user has not classified any data files, process blocks 409 and 411 are skipped.

Referring again to FIG. 15, if the user accesses any of the data files, as determined in decision block 663, process block 665 shows that the relevance values and the believability factors of the particular attributes of the user accessed data files are updated in meta-data table 800. Process block 417 shows that the ratings of data files having attribute values with relevance values that were adjusted in response to the user access are also adjusted. In one embodiment, each time a user accesses or interacts with particular data file, the believability factor of the attribute values of that film are adjusted or updated. For example, FIG. 21 shows a meta-data table 800 that is updated or adjusted in response to the user access of "Action Dude." In this example, the believability factors of "Joe Smith" and "action" are increased since the relevance values for these attribute values were greater than zero. If the user has not accessed any data files, process blocks 415 and 417 are skipped.

FIG. 22 shows content rating table 900, which is updated in response to the user access of "Action Dude," as described in process block 667. As mentioned earlier, content rating table 900 is also updated as described in process block 661. As shown in content rating table 900 of FIG. 22, "Action Dude" has a rating value of 1. The rating type of "Action Dude" is "explicit" because the user explicitly classified "Action Dude," as described above in connection with FIG. 19. The in cache indicator indicates that "Action Dude" is presently locally stored by the client system. The next treatment indicator indicates replace because the user has already watched "Action Dude."

As shown in meta-data table 800 of FIG. 23, the relevance values and believability factors are updated for the attribute values of unclassified data files that are accessed. For instance, assume that the user now watches the movie "Blast 'Em," which the user did not classify. Recall from FIG. 16 that the movie "Blast 'Em" features "Jane Doe" and is an "action" movie. As shown in FIG. 21, the relevance value of "Jane Doe" was less than zero, or −1, prior to the user watching "Blast 'Em." Nevertheless, the user watched "Blast 'Em," despite the fact that it featured actress "Jane Doe." Accordingly, the believability factor of the "Jane Doe" attribute the value is adjusted downward since this particular attribute value now appears less likely or relevant when predicting a user's viewing habits. However, the relevance value and believability factor for the attribute value "action" are adjusted upwards since "action" had a relevance value of greater than zero prior to the user watching "Blast 'Em." Thus, in this example, the relevance value is adjusted upwards from 1 to 2 and the believability factor is also adjusted upwards from 1 to 2. Therefore, the content rating table 800 of FIG. 23 now predicts that "action" movies are movies that the user is more likely to watch.

It is appreciated that the user is not required to classify data files explicitly in order for the meta-data table 800 and content rating table 900 to be updated in accordance with the teachings of the present invention. As a result, the content rating table over time will more accurately predict data files in which the user is interested.

In one embodiment, the data files in which the user is predicted implicitly to be most interested as well as the data files in which the user explicitly classified an interest will be the data files that are cache locally on the client system. In effect, the movies that the user is most likely to want to watch are automatically stored locally, and therefore available "on demand," without the user having to explicitly request these movies in advance or explicitly specify criteria used to identify the movies.

Alternate Embodiments

Several aspects of one implementation of a service provider broadcast system for combining existing broadcast content with cached content have been described. However, various implementations of the service provider broadcast system provide numerous features including, complementing, supplementing, and/or replacing the features described above. Features can be implemented as part of the server or as part of the user's computer system in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a video broadcast, it will be appreciated by those skilled in the art that the teaching of the present invention can be applied to other systems. In fact, systems for broadcasting audio, graphics, text, multi-media files or the like are within the teachings of the present invention, without departing from the scope and spirit of the present invention. The embodiments described above were chosen and described in order to best explain the principles of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiment of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed. For example, the particular element may vary depending on the particular application for the data file format while maintaining substantially the same functionality without departing from the scope and spirit of the present invention.

The present invention provides many advantages over known techniques. The present invention increases the breadth of offering provided by a service provider system by enabling scenarios such as access to content that the service provider system would not ordinarily have broadcast rights to. This provides the user with access to programming for multiple services, thereby increasing their overall satisfaction with the service. In addition, the present invention reduces the user's cognitive load by providing a single personalized list of selections from the various services residing on the box. The user need only learn one interface to access content and is not required to visit more than one location for essentially the same service. Finally, the system allows for optimization of bandwidth by enabling the service provider to factor content already slated for broadcast (albeit via a different channel) to a client out of its scale. This means that the service provider will not have to pay for rebroadcasting content that would already be sent to a client in a timely fashion, but rather concentrate on providing a unique offering to the consumer.

Having disclosed exemplary embodiments and the best mode, modifications and variations may be made to the disclosed embodiments while remaining within the scope of the invention as defined by the following claims.

What is claimed is:

1. A method, comprising:
  acquiring, by a service provider system, service information regarding broadcast service content to be broadcast by a broadcast service system over a predetermined period of time;
  broadcasting, to one or more client systems, a composite content list including meta-data describing service provider content available from the service provider system and the broadcast service content to be broadcast by the broadcast service system;
  rating the service provider content and broadcast service content, described by the composite content list according to ratings for the service provider content and broadcast service content received from the one or more client systems; and
  broadcasting a broadcast schedule for a selected portion of the broadcast service content to the one or more client systems in response to the received ratings, prior to broadcast by the broadcast service system, thereby enabling the one or more client systems to store one or more content data files from the selected portion of the broadcast service content.

2. The method of claim 1, further comprising:
  selecting a portion of the content data files from the service provider content and the broadcast service content having higher ratings based on the received ratings;
  determining overlapping content data files as content data files from the selected portion of the broadcast service content and the service provider content to be broadcast by the broadcast service system;
  eliminating, from the selected portion of the service provider content and the broadcast service content, the overlapping content data files to form a plurality of provider content data files; and
  broadcasting the plurality of the provider content data files to the one or more client systems.

3. The method of claim 2, further comprising broadcasting:
  broadcasting a composite content broadcast schedule for the composite content list prior to broadcasting the composite content list to the one or more client systems; and
  broadcasting a provider broadcast schedule for the provider content data files prior to broadcasting the provider content data files.

4. The method of claim 1 further comprising:
  selecting one or more content data files from the selected portion of the broadcast service content; and
  broadcasting, by the service provider system, the one or more selected content data files to the one or more client systems.

5. The method of claim 1 further comprising:
  receiving compensation for each stored content data file accessed by a user; and
  dividing the compensation between the service provider system and the broadcast service system based on a source of each content data file, such that the source of the content data file is one of the service provider system and the broadcast service system and receives a larger compensation portion and a non-source receives a smaller compensation portion.

6. The method of claim 1, wherein the creating the composite content list further comprises:
  eliminating content meta-data from the broadcast service content and the network service information that falls into one or more predetermined content categories; and
  tagging the network service information with a key to enable identification of duplicate content.

7. A method, comprising:
  rating, in response to a content rating table, at least one content data file from service provider content available from a service provider system and broadcast service content to be broadcast by a broadcast service system, as described by a composite content list received from the broadcast service system, the content rating table generated responsive to a user;
  receiving a broadcast schedule for a selected portion of the broadcast service content broadcast by the broadcast service system; and
  when content data files from the selected portion of the broadcast service content are available, based on the broadcast schedule, storing one or more of the content data files based on the content rating table.

8. The method of claim 7 further comprising:
  receiving a provider broadcast schedule for a plurality of provider content data files from the service provider content;
  receiving the plurality of the provider content data files; and
  storing, based on the content rating table, one or more content data files from the plurality of the provider content data files.

9. The method of claim 7 further comprising:
  receiving a composite content list including meta-data describing service provider content available from the service provider system and the broadcast service content to be broadcast by the broadcast service system;
  receiving a broadcast schedule for the composite content list broadcast by the service provider system, the client system activated in response to the broadcast schedule; and
  transmitting the ratings of the at least one content data file from the service provider content and broadcast service content to the service provider system.

10. The method of claim 7, wherein the storing the one or more content data files further comprises:
  siphoning MPEG data representing each of the one or more content data files from a decode stage of an MPEG content transport stream;
  storing elementary streams and attendant data from the siphoned MPEG data;
  encoding the stored streams and data into packetized element streams;
  re-multiplexing the packetized element streams into a captured content transport stream; and
  storing the captured content transport stream into a secondary cache to enable playback, by a user, of the one or more content data files represented by the captured content transport stream.

11. The method of claim 7, wherein the storing the one or more content data files further comprises:
- capturing the one or more content data files using content capture functionality of the client platform;
- encoding the captured content data files into packetized element streams; and
- storing the packetized element stream into a secondary cache to enable playback, by a user, of the one or more content data files represented by the packetized element streams.

12. An apparatus, comprising:
- a processor having circuitry to execute instructions;
- a communications interface coupled to the processor, the communications interface to broadcast data to one or more client systems, and to receive data from the one or more client systems;
- a storage device coupled to the processor, having sequences of instructions stored therein, which when executed by the processor cause the processor to:
  - acquire, by a service provider system, service information regarding broadcast service content to be broadcast by a broadcast service system over a predetermined period of time,
  - create a composite content list including meta-data describing service provider content available from the service provider system and the broadcast service content to be broadcast by the broadcast service system,
  - broadcast the composite content list to one or more client systems,
  - rate the service provider and broadcast service content described by the composite content list, and
  - broadcast a broadcast schedule for a selected portion of the broadcast service content to the one or more client systems in response to the received ratings, prior to broadcast by the broadcast service, to enable the one or more client systems to store one or more content data files from the selected portion of the broadcast service content.

13. The apparatus of claim 12 wherein the processor is further caused to:
- receive ratings for the service provider and broadcast service content described by the composite content list from the one or more client systems,
- select one or more content data files from the selected portion of the broadcast service content, and
- broadcast, by the service provider system, the one or more selected content data files to the one or more client systems.

14. The apparatus of claim 12 wherein the processor is further caused to:
- select a portion of the content data files from the service provider content and the broadcast service content having higher ratings based on the received ratings;
- determine overlapping content data file as content data files from the portion of the broadcast service content and the service provider content to be broadcast by the broadcast service system;
- eliminate, from the selected portion of the service provider content and the broadcast service content, the overlapping content data files to form a plurality of provider content data files; and
- broadcast the plurality of the provider content data files to the one or more client systems in response to the received ratings.

15. The apparatus of claim 12 wherein the instruction to create a composite content list further causes the processor to:
- eliminate content meta-data from the broadcast service content and the network service information that falls into one or more predetermined content categories; and
- tag the network service information with a key to enable identification of duplicate content.

16. The apparatus of claim 12 wherein the processor is further caused to:
- broadcast a broadcast schedule for the composite content list prior to broadcasting the composite content list to the one or more client systems; and
- broadcast a provider broadcast schedule for the plurality of the provider content data prior to broadcasting the plurality of the provider content data files.

17. An apparatus, comprising:
- a processor having circuitry to execute instructions;
- a communications interface coupled to the processor, the communications interface to receive data broadcast from a service provider system, and to transmit data to the service provider system;
- a storage device coupled to the processor, having sequences of instructions stored therein, which when executed by the processor cause the processor to:
  - rate, in response to a content rating table, at least one content data file from service provider content available from the service provider system and the broadcast service content to be broadcast by a broadcast service system, as described by a composite content list received from the broadcast service system, the content rating table generated responsive to a user,
  - receive a broadcast schedule for a selected portion of the broadcast service content broadcast by the broadcast service system, and
  - when content data files from the selected portion of the broadcast service content are available based on the broadcast service broadcast schedule, store one or more of the content data files based on the content rating table.

18. The apparatus of claim 17 wherein the processor is further caused to:
- receive a service provider broadcast schedule for a plurality of provider content data files;
- receive the plurality of the provider content data files; and
- store, based on the content rating table, one or more content data files from the plurality of the provider content data file.

19. The apparatus of claim 17 wherein the processor is further caused to:
- receive a composite content list including meta-data describing service provider content available from the service provider system and the broadcast service content to be broadcast by the broadcast service system;
- receive a broadcast schedule for the composite content list broadcast by the service provider system, the client system activated in response to the broadcast schedule; and
- transmit the ratings of the at least one content data file from the service provider content and broadcast service content to the service provider system.

20. The apparatus of claim 17, wherein the instruction to store the one or more content data files further causes the processor to:
- siphon MPEG data representing each of the one or more content data files from a decode stage of an MPEG content transport stream;

store elementary streams and attendant data from the siphoned MPEG data;

encode the stored streams and data into a packetized element stream;

re-multiplex the packetized element streams into a captured content transport stream; and store the captured content transport stream into a secondary cache to enable playback, by a user, of one or more content data files represented by the captured content transport stream.

21. The apparatus of claim 19, wherein the instruction to store the one or more content data files further causes the processor to:

capture the one or more content data files using content capture functionality of the client platform;

encode the captured content data file into packetized element streams; and store the packetized element streams into a secondary cache to enable playback, by a user, of the one or more content data files represented by the packetized element streams.

22. A machine-readable medium having instructions stored thereon, which when executed by a processor cause the processor to:

acquire, by a service provider system, service information regarding broadcast service content to be broadcast by a broadcast service system over a predetermined period of time;

broadcast, to one or more client systems, a composite content list including meta-data describing service provider content available from the service provider system and the broadcast service content to be broadcast by the broadcast service system;

rate the service provider content and broadcast service content, described by the composite content list according to ratings for the service provider content and broadcast service content received from the one or more client systems; and broadcast a broadcast schedule for a selected portion of the broadcast service content to the one or more client systems in response to the received ratings, prior to broadcast by the broadcast service system, thereby enabling the one or more client systems to store one or more content data files from the selected portion of broadcast service content.

23. The machine-readable medium of claim 22 wherein the processor is further caused to:

select a portion of the content data files from the service provider content and the broadcast service content having higher ratings based on the received ratings;

determine overlapping content data files as content data files from the selected portion of the broadcast service content and the service provider content to be broadcast by the broadcast service system;

eliminate, from the selected portion of the service provider content and the broadcast service content, the overlapping content data files to form a plurality of provider content data files; and broadcast the plurality of the provider content data files to the one or more client systems.

24. The machine-readable medium of claim 22 wherein the processor is further caused to:

receive ratings for the service provider and broadcast service content, described by the composite content list, from the one or more client systems; and combine the ratings received from the one or more client systems, if ratings are received from more than one client system, to generate an overall ratings list of the service provider and broadcast service content data files.

25. A machine-readable medium having instructions stored thereon, which when executed by a processor cause the processor to:

rate, in response to a content rating table, at least one content data file from service provider content available from a service provider system and the broadcast service content to be broadcast by a broadcast service system, as described by a composite content list from the broadcast service system, the content rating table generated responsive to a user;

receive a broadcast schedule for a selected portion of the broadcast service content broadcast by the broadcast service system; and when content data files from the selected portion of the broadcast service content are available, based on the broadcast schedule, store one or more of the content data files based on the content rating table.

26. The machine-readable medium of claim 25 wherein the processor is further caused to:

receive a composite content list including meta-data describing the service provider content available from the service provider system and the broadcast service content to be broadcast by the broadcast service system;

transmit the ratings of the at least one content data file from the service provider content and broadcast service content to the service provider system;

receive a provider broadcast schedule for a plurality of provider content data files;.

receive the plurality of the provider content data files; and store, based on the content rating table, one or more content data files from the plurality of the provider content data files.

27. The machine-readable medium of claim 25 wherein the instruction to store one or more of the content data files further causes the processor to:

siphon MPEG data representing each of the one or more content data files from a decode stage of an MPEG content transport stream;

store elementary streams and attendant data from the siphoned MPEG data;

encode the stored streams and data into packetized element streams;

re-multiplex the packetized element streams into a captured content transport stream; and store the captured content transport stream into a secondary cache to enable playback, by a user, of the one or more content data files represented by the captured content transport stream.

28. A system, comprising:

a service provider broadcast server; and one or more client systems coupled to the service provider broadcast server, wherein the one or more client systems rate, in response to a content rating table, one or more content data files described by a composite content list, the content rating table generated responsive to content data files previously accessed and the composite content list including meta-data describing service provider content available from a service provider system and broadcast service content to be broadcast by a broadcast service system, wherein the one or more client systems transmit, to the service provider broadcast server, the ratings of the content data files from the composite content list, wherein the service provider system selects a portion of the content data files from the service provider content and the broadcast service content in response to the ratings received from the one or more client systems, wherein the service provider system further broadcasts a broadcast schedule for the selected portion of the broadcast service content to the one or more client systems, prior to broadcast by the broadcast service system, to enable the one or more client systems to store one or more content data files from the selected portion of broadcast service content, and wherein the service provider broadcast server further broadcasts the selected portion of the service provider content to the one or more client systems.

29. The system of claim 28:

wherein each one of the one or more client systems receive content data files from the selected portion of the broadcast service content; and wherein the one or more client systems store one or more of the content data files from the selected portion of the broadcast service content in response to a content rating table associated with each respective one of the one or more client systems.

30. The system of claim 28:

wherein each one of the one or more client systems receive content data files from the selected portion of the service provider content, and wherein the one or more client systems store one or more of the content data files from the selected portion of the service provider content in response to a content rating table associated with each respective one or more client systems.

31. A method comprising:

broadcasting, to one or more client systems, a composite content list, including metadata describing service provider content available from a service provider system and broadcast service content to be broadcast by a broadcast service system;

rating the service provider content and the broadcast service content, described by the composite content list, according to ratings for the service provider content and the broadcast service content received from the one or more client systems;

selecting a portion of the content data files from the service provider content and the broadcast service content having higher ratings based on the received ratings;

determining overlapping content data files as content data files from the selected portion of the broadcast service content and the service provider content to be broadcast by the broadcast service system;

eliminating, from the selected portion of the service provider content and the broadcast service content, the overlapping content data files to form a plurality of provider content data files; and broadcasting the plurality of the provider content data files to the one or more client systems.

* * * * *

UNITED STATES PATENT AND TRADEMARK OFFICE
CERTIFICATE OF CORRECTION

PATENT NO. : 7,185,352 B2
APPLICATION NO. : 09/854129
DATED : February 27, 2007
INVENTOR(S) : Hallford et al.

It is certified that error appears in the above-identified patent and that said Letters Patent is hereby corrected as shown below:

In column 3, at line 41, delete "purpose" and insert --purposes--.

In column 4, at line 59, delete "11." and insert --111.--.

In column 5, at line 38, after "signals" insert --,--.

In column 6, at line 13, delete "services" and insert --Services--.

In column 6, at line 44, delete "control;" and insert --controls--.

In column 7, at line 57, delete "," and insert --.--.

In column 10, at line 49, delete "," and insert --.--.

In column 12, at line 23, delete the first occurrence of "," and insert --.--.

In column 13, at line 50, after "streams" insert --.--.

In column 16, at line 44, delete "seen" and insert --been--.

Signed and Sealed this

Sixth Day of May, 2008

JON W. DUDAS
*Director of the United States Patent and Trademark Office*